US007977409B2

(12) United States Patent
Nishiguchi et al.

(10) Patent No.: US 7,977,409 B2
(45) Date of Patent: Jul. 12, 2011

(54) INK JET INK, INK JET RECORDING METHOD, AND INK CARTRIDGE

(75) Inventors: Kenji Nishiguchi, Yokohama (JP); Katsuhiro Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 12/572,581

(22) Filed: Oct. 2, 2009

(65) Prior Publication Data

US 2010/0086688 A1 Apr. 8, 2010

(30) Foreign Application Priority Data

Oct. 7, 2008 (JP) .................................. 2008-260615

(51) Int. Cl.
*C09D 11/10* (2006.01)
(52) U.S. Cl. ........ 523/160; 523/161; 524/555; 524/556; 524/560; 347/86; 347/100
(58) Field of Classification Search .................. 523/160, 523/161; 524/555, 556, 560
See application file for complete search history.

(56) References Cited

U.S. PATENT DOCUMENTS

| | | | | |
|---|---|---|---|---|
| 4,556,683 | A | 12/1985 | Hirasawa et al. | 523/447 |
| 6,177,540 | B1 * | 1/2001 | Harlan et al. | 528/364 |
| 6,336,966 | B1 * | 1/2002 | Coca et al. | 106/499 |
| 7,378,459 | B2 | 5/2008 | Nishiguchi | 523/160 |
| 7,629,395 | B2 | 12/2009 | Nishiguchi et al. | 523/160 |
| 2002/0115798 | A1 * | 8/2002 | Narayan-Sarathy et al. | 525/261 |
| 2004/0212667 | A1 | 10/2004 | Nishiguchi | 347/96 |
| 2007/0287769 | A1 | 12/2007 | Nishiwaki et al. | 523/160 |
| 2008/0139740 | A1 | 6/2008 | Nishiwaki et al. | 524/556 |
| 2008/0146712 | A1 * | 6/2008 | Yatake | 524/376 |
| 2008/0146723 | A1 | 6/2008 | Nishiwaki et al. | 524/500 |
| 2008/0269407 | A1 | 10/2008 | Nishiguchi et al. | 524/592 |
| 2008/0292793 | A1 | 11/2008 | Yamashita et al. | 427/256 |
| 2008/0292794 | A1 | 11/2008 | Sato et al. | 427/256 |

FOREIGN PATENT DOCUMENTS

EP 1 008 634 A1 6/2000
(Continued)

OTHER PUBLICATIONS

Harry J. Spinelli, "Polymeric Dispersants in Ink Jet Technology", Advanced Materials, Wiley VCH Verlag, vol. 10, No. 15, Oct. 20, 1998, pp. 1215-1218.
David M. Haddleton, et al., "Synthesis of Methacrylic Multi-Arm Star Copolymers by 'Arm-First' Group Transfer Polymerisation", Macromolecular Chemistry and Physics, Wiley-VCH Verlag, Weinheim, DE, vol. 198, No. 3, Mar. 1, 1997, pp. 871-881.
Jan. 28, 2010 European Search Report in European Patent Application No. 09172307.2.
G.J. Fleer, et al., Polymers at Interfaces, Springer, 1993, pp. 27-42.
Akira Hirao, et al., "Precise Synthesis of Well-Defined Dendrimer-Like Star-Branched Polymers by Iterative Methodology Based on Living Anionic Polymerization", Journal of Polymer Science: Part A: Polymer Chemistry, vol. 44, Jul. 2006, pp. 6659-6687.

*Primary Examiner* — David Wu
*Assistant Examiner* — Vu A Nguyen
(74) *Attorney, Agent, or Firm* — Fitzpatrick, Cella, Harper & Scinto

(57) ABSTRACT

Provided is an ink jet ink capable of achieving both high colorability and excellent bleeding resistance of an image. The ink jet ink includes at least a pigment and a star polymer in which at least three copolymer chains of $\alpha,\beta$-ethylenically unsaturated monomers are bonded to a central skeleton, in which the copolymer chains of the $\alpha,\beta$-ethylenically unsaturated monomers are copolymers of at least one first monomer selected from the group consisting of aromatic (meth)acrylates and aromatic (meth)acrylamides and at least one second monomer selected from the group consisting of acid monomers and salts of the acid monomers.

13 Claims, 2 Drawing Sheets

FOREIGN PATENT DOCUMENTS

| | | |
|---|---|---|
| EP | 1770131 A1 | 4/2007 |
| EP | 1935652 A1 | 6/2008 |
| JP | 59-124922 | 7/1984 |
| JP | 7-179538 | 7/1995 |
| JP | 9-249709 | 9/1997 |
| JP | 2000-169771 | 6/2000 |
| JP | 2001-040256 | 2/2001 |
| JP | 2002-128898 | 5/2002 |

* cited by examiner

INK JET INK, INK JET RECORDING METHOD, AND INK CARTRIDGE

BACKGROUND OF THE INVENTION

1. Field of the Invention

The present invention relates to an ink jet ink, an ink jet recording method, and an ink cartridge.

2. Description of the Related Art

In conventional cases, a dye that can be dissolved in an aqueous medium in ink for use in ink jet recording has been mainly used as a coloring material in the ink; in recent years, investigations on the use of a pigment have been underway from the viewpoints of, for example, the light fastness and water resistance of an image. Further, investigations have been underway on the use of various polymers as a dispersant for dispersing a pigment and an additive for improving scratch resistance or marker resistance.

In each of Japanese Patent Application Laid-Open No. 2000-169771 and Japanese Patent Application Laid-Open No. 2001-040256, there is proposed an ink jet ink containing a polymer having a star structure (star polymer).

However, an ink jet ink having the following characteristics has been heretofore absent: the ink is an aqueous ink containing an aqueous medium, uses a star polymer as a dispersion polymer for a pigment, and can provide an image having high colorability and excellent bleeding resistance.

An ink using a star polymer specifically described in Japanese Patent Application Laid-Open No. 2000-169771 has been unable to provide sufficient colorability and sufficient bleeding resistance. In addition, the star polymer described in Japanese Patent Application Laid-Open No. 2000-169771 has neither a central compound that can be isolated nor a copolymer chain of a structure necessary for turning the polymer into a dispersion polymer. Further, reactive functional groups are crosslinked upon synthesis of the star polymer, so the central skeleton of the star polymer becomes bulky. As a result, the adsorption of the polymer to the surface of a pigment is hardly performed upon dispersion of the pigment. In addition, in the synthesis method described in Japanese Patent Application Laid-Open No. 2000-169771, the number of copolymer chains of which one molecule of the star polymer is formed cannot be controlled so that the star polymer has desired characteristics. Therefore, the molecular weight distribution of the polymer becomes broad. Of the star polymers synthesized as described above, a polymer which has a low molecular weight and is hard to adsorb acts as a penetrating agent for ink on a recording medium. In addition, a high-molecular-weight polymer out of such polymers adsorbs to the pigment, but a steric hindrance repulsive force acts between the molecules of the polymer, and the repulsive force may lead to a reduction in aggregating performance of the pigment. Accordingly, there still exists a problem to be solved in order that the star polymer may be used as a dispersion polymer.

An ink using a star polymer specifically described in Japanese Patent Application Laid-Open No. 2001-040256 has been unable to provide sufficient colorability and sufficient bleeding resistance. Further, in the invention described in Japanese Patent Application Laid-Open No. 2001-040256, the star polymer is not used as a dispersion polymer, and the main purpose of the invention is to improve the fixing performance (scratch resistance or marker resistance) of the ink through the addition of the star polymer. In other words, the star polymer described in Japanese Patent Application Laid-Open No. 2001-040256 does not function as a dispersion polymer for a pigment either.

Therefore, an object of the present invention is to provide an ink jet ink capable of achieving both high colorability and excellent bleeding resistance of an image. Another object of the present invention is to provide an ink jet recording method and an ink cartridge using the ink jet ink.

SUMMARY OF THE INVENTION

The above-mentioned objects are attained by the following present invention. That is, the present invention provides an ink jet ink including at least: a pigment; and a star polymer in which at least three copolymer chains of $\alpha,\beta$-ethylenically unsaturated monomers are bonded to a central skeleton, in which the copolymer chains of the $\alpha,\beta$-ethylenically unsaturated monomers are copolymers of at least one first monomer selected from the group consisting of aromatic (meth) acrylates and aromatic (meth)acrylamides and at least one second monomer selected from the group consisting of acid monomers and salts of the acid monomers.

Further, the present invention provides an ink jet recording method including ejecting ink according to an ink jet system to perform recording on a recording medium, in which the ink used in the ink jet recording method is the ink jet ink according to the present invention.

Further, the present invention provides an ink cartridge including an ink storage portion for storing ink, in which the ink stored in the ink storage portion is the ink jet ink according to the present invention.

According to the present invention, there can be provided an ink jet ink capable of achieving both high colorability and excellent bleeding resistance of an image. In addition, according to another embodiment of the present invention, there can be provided an ink jet recording method using the ink jet ink. Further, according to still another embodiment of the present invention, there can be provided an ink cartridge.

Further features of the present invention will become apparent from the following description of exemplary embodiments with reference to the attached drawings.

DESCRIPTION OF THE EMBODIMENTS

Figure 1:
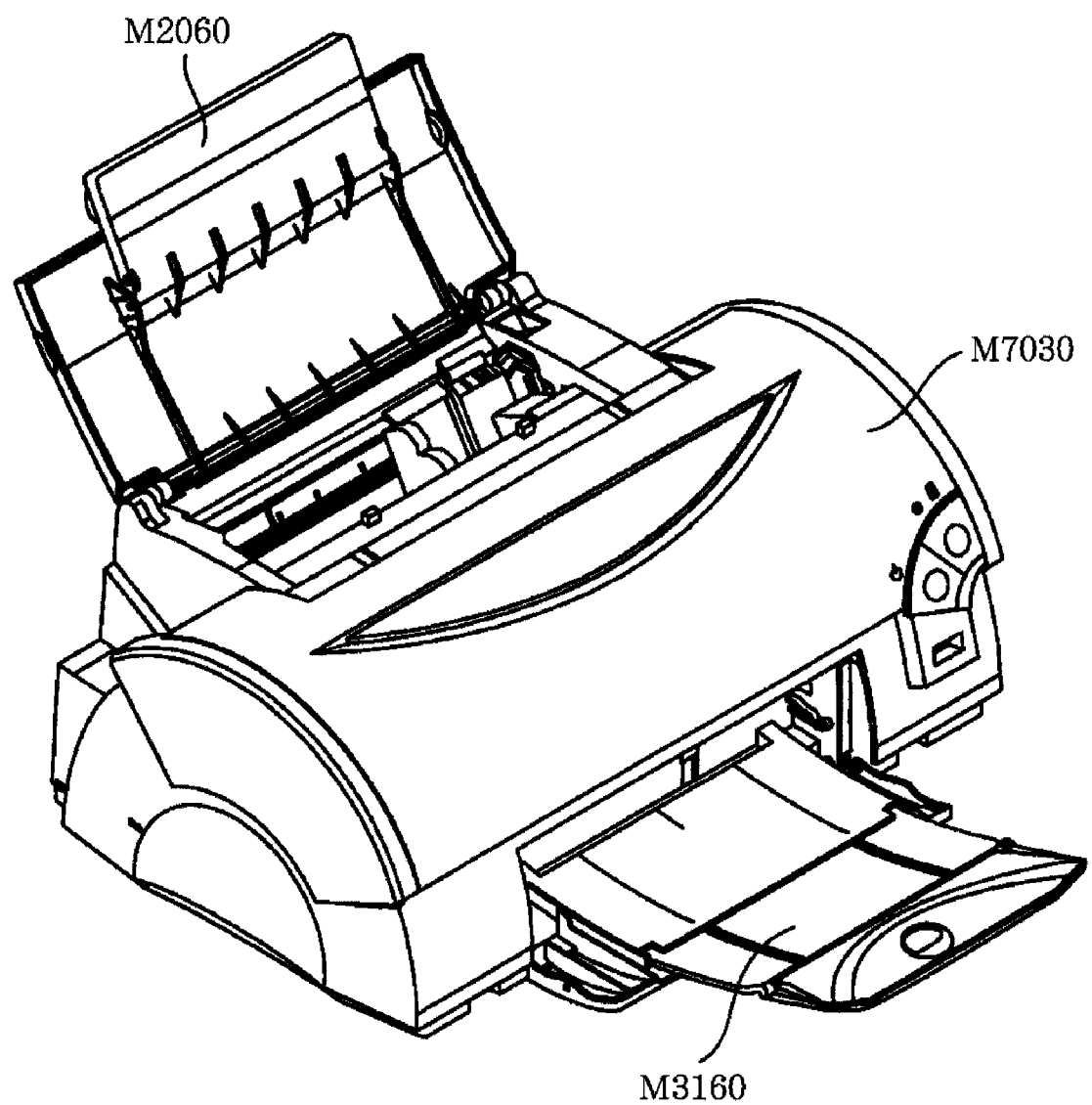
FIG. 1 is a perspective view of an ink jet recording apparatus.

Hereinafter, the present invention is described in more detail by way of a preferred embodiment. It should be noted that an ink jet ink may be simply referred to as "ink" in the following description. In addition, when a compound is a salt, the compound may dissociate in an aqueous medium to exist in the form of an ion; this case is also included in the expression "contains a salt" for convenience in the present invention.

Described below is the reason why the inventors of the present invention have conducted investigations on the above problems of the prior art to reach the present invention. First, as described above, a problem in a linear dispersion polymer is as follows: a trade-off develops between the stability of the adsorption of the dispersion polymer to a pigment and the aggregating performance of the pigment on a recording medium depending on the molecular weight of the dispersion polymer. That is, as the molecular weight reduces, the number of points at which the dispersion polymer adsorbs to the pigment reduces, so its ability to stabilize the adsorption of the dispersion polymer is impaired. On the other hand, as the molecular weight increases, the molecular size (hydrodynamic radius or radius of inertia) of the polymer increases. In addition, molecules of the polymer having a large molecular weight serve as a steric hindrance repulsive force between pigment particles, so the aggregating performance of pigment particles on the recording medium is inhibited. Accordingly, it has been extremely difficult to find out the molecular weight at which those two characteristics can be achieved. In view of the foregoing, the inventors have conducted investigations with a view to overcoming the trade-off. As a result, the inventors have drawn the following conclusion.

The phenomenon in which a polymer adsorbs to an interface has been described in a document (Polymers at interfaces, G. J. Fleer et al., Springer, 1993). A state where the polymer adsorbs to the interface such as a pigment surface means that the polymer contacts the interface to be bound by the interface. Therefore, in order that the stability of the adsorption of the polymer to a pigment is improved, the probability that the polymer contacts the pigment surface (interface) needs to be increased, and at the same time, an entropy change at a time point when the polymer adsorbs to (is bound by) the pigment surface needs to be reduced.

In view of the foregoing, the inventors of the present invention have thought as described below. First, it is necessary only that the polymer is capable of moving around freely in an aqueous medium in order that the probability that the polymer contacts the pigment surface is increased. Accordingly, a reduction in molecular weight of the polymer or an increase in number of hydrophilic terminals of the polymer is advantageous for the increase. In addition, the following state is advantageous for the reduction in entropy change upon adsorption of the polymer to the pigment surface: the polymer is of such a structure that a large number of bonds are present in its chain. Meanwhile, a state where the polymer has a large molecular weight is advantageous for preventing the polymer that has once adsorbed to the pigment surface from desorbing again because the stability of the adsorption improves as the number of adsorption points at which the chain of the polymer adsorbs increases. In view of the foregoing, the inventors have thought that a trade-off relationship develops between the increase of the probability that the polymer adsorbs to the pigment and an improvement in stability of the adsorption depending on the molecular weight of the polymer. In addition, the inventors have thought that a polymer of such a structure as to have a large number of terminals, i.e., branch points, is advantageous for the stabilization of the adsorption.

In addition, the molecular size of a star polymer can be reduced as compared to that of a linear polymer when number of copolymerized monomers is equal. Accordingly, the inventors of the present invention have thought that the steric hindrance repulsive force of the star polymer can be made relatively small, and hence, the extent to which the aggregation of the particles of the pigment on a recording medium is inhibited can be reduced. Further, as described above, when the central skeleton of the star polymer formed of copolymer chains adsorbs to the pigment surface, the distance to which the steric hindrance repulsive force extends from the surface of each particle of the polymer may substantially depend on the molecular weight (molecular size) of each arm (copolymer chain). Further, the reduction of an inhibiting action on the aggregation exerted by the steric hindrance repulsive force can be expected.

In addition, the star polymer is of such a structure that multiple copolymer chains are bonded to the central skeleton, and the composition of each copolymer chain can be made to vary from copolymer chain to copolymer chain. Here, when copolymer chains showing a variation in composition are bundled so as to be of a star polymer shape, varying compositions in multiple star polymer molecules are averaged or uniformized. Therefore, generation of polymer molecules extremely different from each other in composition as observed in the low-molecular-weight region of a conventional random polymer hardly occurs.

In addition to the above constitution, the copolymer chains in the star polymer used in the present invention are each a copolymer chain of an aromatic (meth) acrylate or an aromatic (meth) acrylamide and an acid monomer or a salt thereof. As a result, significant effects of the present invention, i.e., extremely excellent colorability and extremely excellent bleeding resistance have been obtained. Although the reason for the foregoing is unclear, the constitution of each of the basic skeleton and central skeleton of the above star polymer, and the constitution of each copolymer chain are assumed to act synergistically.

<Ink Jet Ink>
(Polymer Having Star Structure (Star Polymer))

An ink of the present invention is an ink containing: a star polymer in which at least three specific copolymer chains are bonded to a central skeleton; and a pigment. The star polymer has such a star structure that a copolymer obtained by copolymerizing at least a first monomer selected from aromatic (meth)acrylates and aromatic (meth) acrylamides and a second monomer selected from acid monomers and salts thereof is bonded to the central skeleton.

The term "star structure" as used in the present invention refers to a structure having a center and three or more lines radially extending from the center toward the outside. Thus, the term "star polymer (polymer having a star structure)" as used in the present invention refers to a polymer having a central skeleton and three or more copolymer chains radially extending from the central skeleton toward the outside.

In addition, the star polymer needs to be obtained by bonding the three or more copolymer chains to the central skeleton. It should be noted that the "central skeleton" of the star polymer of the present invention means the structure of a part excluding the copolymer chains of which the star polymer is formed. In addition, the central skeleton itself of the star polymer of the present invention can be isolated. The compound obtained by the isolation has the central skeleton; in the present invention, the compound having the central skeleton is referred to as "central compound". In addition, the star polymer described above, when used as a dispersion polymer for a pigment, can best exert the effect of achieving both high colorability and bleeding resistance when the prepared ink is used to record an image.

As the first monomer for constituting the copolymer chain of $\alpha,\beta$-ethylenically unsaturated monomers, at least one monomer selected from aromatic (meth)acrylates and aromatic (meth)acrylamides is mentioned. Specific examples thereof include: benzyl (meth)acrylate; 2-phenoxyethyl (meth)acrylate; 2-hydroxy-3-phenoxy (meth)acrylate; and ester compounds of $\alpha,\beta$-ethylenically unsaturated carboxylic acid with a substituted aromatic alcohol and amide compounds of $\alpha,\beta$-ethylenically unsaturated carboxylic acid with a substituted aromatic amine such as 2-(meth)acryloyloxyethyl phthalic acid and benzyl (meth)acrylamide. Of those, in terms of improving dispersion stability, benzyl (meth)acrylate is preferably used. It should be noted that, in the present invention, "(meth)acrylate" means both "acrylate" and "methacrylate", and "(meth)acryloxy" means both "acryloxy" and "methacryloxy".

As the second monomer for constituting the copolymer chain of $\alpha,\beta$-ethylenically unsaturated monomers, at least one monomer selected from an acid monomer and salts thereof are mentioned. Specific examples thereof include vinyl compounds and salts thereof having an acid group such as (meth)acrylic acid, maleic acid, maleic acid derivatives, itaconic acid, itaconic acid derivatives, fumaric acid, fumaric acid derivatives, vinyl sulfonic acid, and vinyl phosphonic acid. Examples of salts include potassium salts, sodium salts, lithium salts, ammonium salts, and various organic quaternary ammonium salts of the above monomers. As the at least one monomer selected from the acid monomer and salts thereof, because the water solubility of the star polymer becomes high as a result of copolymerization, (meth)acrylic acid and salts thereof are preferred, and as the salts, potassium salts and sodium salts are preferred. Further, an α,β-ethylenically unsaturated carboxylate such as methyl-, ethyl-, or butyl (meth)acrylate is used for copolymerization, followed by hydrolyzing an ester bond, and the resultant may be used as a (meth)acrylic acid or a salt thereof.

It should be noted that a monomer except those listed above can be used in combination with the monomers of which the copolymer chains of the star polymer used in the present invention are formed to such an extent that the achievement of the objects of the present invention is not inhibited. Specific examples of the monomers include: (meth)acrylates such as methyl (meth)acrylate, ethyl (meth)acrylate, butyl (meth)acrylate, methoxyethyl (meth)acrylate, ethoxyethyl (meth)acrylate, hydroxyethyl (meth)acrylate, diethyleneglycol (meth)acrylate; triethyleneglycol (meth)acrylate, tetraethyleneglycol (meth)acrylate, polyethyleneglycol (meth)acrylate, methoxydiethyleneglycol (meth)acrylate, methoxytriethyleneglycol (meth)acrylate; methoxytetraethyleneglycol (meth)acrylate, methoxypolyethyleneglycol (meth)acrylate, cyclohexyl (meth)acrylate, isobornyl (meth)acrylate, and N,N-dimethylaminopropyl (meth)acrylate; (meth)acrylamides such as (meth)acrylamide, morpholine (meth)acrylamide, N-methylol (meth)acrylamide, and N-isopropyl (meth) acrylamide; and vinyl compounds such as N-vinylacetamide, N-vinylformamide, N-vinylpyridine, N-vinylpyrrolidone, and N-vinylcarbazole.

The star polymer is synthesized by bonding copolymer chains each obtained by copolymerizing two or more of such monomers as listed above to the central compound. A method of synthesizing the star polymer is, for example, a method involving the use of a polyvalent mercapto compound as a sulfur-containing compound as a chain transfer agent described in Japanese Patent Application Laid-Open No. H07-179538. In this case, the star polymer is of the following structure: the polyvalent mercapto compound serving as the chain transfer agent is the central compound, a portion obtained by removing hydrogen atoms from the mercapto groups of the polyvalent mercapto compound serving as the chain transfer agent is the central skeleton, and a copolymer chain of α,β-ethylenically unsaturated monomers extends from each sulfur atom of the portion.

Alternatively, an atom transfer radical polymerization method (ATRP) involving the use of a polyvalent halogen compound as a polymerization initiator or a living anion polymerization method involving the use of the polyvalent halogen compound as a polymerization terminator may also be employed. In the case of each of those methods, the star polymer is of the following structure: the polyvalent halogen compound is the central compound, a portion obtained by removing halogen atoms from the polyvalent halogen compound is the central skeleton, and a copolymer chain of α,β-ethylenically unsaturated monomers extends from a carbon atom of the compound to which a halogen atom was bonded.

Examples of polymercapto compounds which may be used in the central compounds include ester compounds of polyalcohol compounds with thioglycolatic acid or thiopropionic acid. Specific examples thereof include tris[(3-mercaptoacetoxy)-ethyl]isocyanurate, tris[(3-mercaptopropionyloxy)-ethyl]isocyanurate, trimethylolpropane trithioglycolate, trimethylolpropane trithiopropionate, pentaerythritol tetrakisthioglycolate, pentaerythritol tetrakisthiopropionate, dipentaerythritol hexakisthioglycolate, dipentaerythritol hexakisthiopropionate, and ester compounds of D-arabitol, xylitol, adonitol, dulcitol, L-iditol, cyclitol, inositol, D-mannitol, and D-sorbitol, polyglycerine #310, polyglycerine #500, and polyglycerine #750 which are glycerin condensates (all of which are product names manufactured by Sakamoto Yakuhin Kogyo Co., Ltd.) with thioglycolic acid and thiopropionic acid.

Further, examples of the polyvalent halogen compound that can be used as the central compounds include 1,2,4,5-tetrakis(bromomethyl)benzene, 1,1,4,4-tetrakis(3-bromomethylphenyl)butane, 1,2,4,5-tetrakis(α-chlorophenylacetoxymethyl)benzene, 1,1,4,4-tetrakis[3-(α-chlorophenylacetoxymethyl)phenyl]butane, and 1,1,4,4-tetrakis[3-(α-chlorophenylacetoxymethyl)]ethane.

Of those central compounds, a sulfur-containing compound is preferably used, and further, a polyvalent mercapto compound containing a sulfur atom is particularly preferably used. This is because of the following reasons: the star polymer can be synthesized by free radical polymerization, so limitations on monomers that can be used in the copolymerization can be reduced; in addition, the star polymer can be synthesized in one stage because the polymerization mechanism is such that each copolymer chain as an arm extends from the central skeleton.

The molecular weight of the star polymer used in the present invention is represented by a number-average molecular weight (Mn) in terms of polystyrene obtained by gel permeation chromatography (GPC). The molecular weight is preferably 1,000 or more and 35,000 or less, more preferably 1,000 or more and 10,000 or less, or particularly preferably 2,000 or more and 10,000 or less. When the number-average molecular weight is less than 1,000, the adsorbing performance of the star polymer to the pigment may reduce in some cases. On the other hand, when the above molecular weight exceeds 35,000, the steric hindrance repulsive force of the star polymer increases, so the aggregating performance of the pigment on a recording medium reduces, and hence, the ink may be unable to obtain a sufficient effect of improving colorability.

In addition, the copolymer chains of the star polymer (hereinafter, a copolymer chain in the star polymer may also be referred to as an "arm") each preferably have a number-average molecular weight of 400 or more and 3,000 or less. When the above molecular weight is less than 400, the adsorbing performance of the polymer to the pigment reduces, so the amount of the polymer that does not adsorb to the pigment may increase in the ink. As a result, an improving effect of the star polymer on the bleeding resistance of an image formed with the ink cannot be sufficiently obtained in some cases. In addition, when the above molecular weight exceeds 3,000, the steric hindrance repulsive force of the star polymer adsorbing to the pigment increases, so the aggregating performance of the pigment on a recording medium reduces. As a result, an improving effect of the star polymer on the colorability of the ink on plain paper cannot be sufficiently obtained in some cases.

In addition, the molecular weight distribution of the star polymer can be obtained from gel permeation chromatography (GPC) in terms of polystyrene of the star polymer. The molecular weight distribution of the star polymer obtained by GPC is a ratio of the weight-average molecular weight Mw of the polymer in terms of polystyrene to the number-average molecular weight Mn in terms of polystyrene. The ratio preferably satisfies the relationship of $1.0 \leq (Mw/Mn) \leq 1.5$. In principle, the molecular weight distribution Mw/Mn does not become lower than 1.0. However, when the molecular weight distribution exceeds 1.5, the molecular weight distribution widens, so there is an increasing possibility that a low-molecular-weight polymer molecule having a weak adsorbing force to the pigment and a high-molecular-weight polymer molecule that increases the steric hindrance repulsive force of the pigment are simultaneously present. Accordingly, the polymer may be unable to obtain a sufficient improving effect on the colorability and bleeding resistance on plain paper.

The star polymer used in the ink of the present invention is preferably as follows: the compositions of the monomers of which both a region from the start of the peak of the molecular weight distribution of the polymer obtained by GPC to 50% of the area of the peak and a region from 50% of the area to 100% of the area are uniform. To be specific, existence ratios $M_1/M_2$ of the first monomer $M_1$ to the second monomer $M_2$ determined in the above respective regions are compared. That is, proximity between the compositions of the monomers of which the respective regions are formed is determined by comparing ratios $M_1(50)/M_2(50)$ and $M_1(100)/M_2(100)$. In the foregoing description, the ratio $M_1(50)/M_2(50)$ is the ratio between the monomers $M_1$ and $M_2$ in the region from the start of the peak to 50% of the area of the peak, and the ratio $M_1(100)/M_2(100)$ is the ratio between the monomers $M_1$ and $M_2$ in the region from 50% of the area of the peak to 100% of the area. In the present invention, the ratio $[M_1(50)/M_2(50)]/[M_1(100)/M_2(100)]$ is preferably 0.8 or more and 1.2 or less. When the above value is less than 0.8, the amount of a hydrophobic low-molecular-weight component becomes relatively large, so the ejection failure of the ink resulting from the insoluble component occurs, and the ink cannot obtain high colorability in some cases. In addition, when the above value exceeds 1.2, the amount of a hydrophilic low-molecular-weight component becomes relatively large, so the extent to which the component acts as a penetrating agent for the ink enlarges, and it becomes difficult to achieve both high colorability and bleeding resistance of the ink in some cases.

In addition, regarding the number of arms of the star polymer, it is necessary that at least three copolymer chains are bonded. In addition, the number is preferably eight or less, and is more preferably three or more and eight or less. When more than eight arms are bonded, the steric hindrance repulsive force of the pigment increases, so the aggregating performance of the pigment on a recording medium reduces. As a result, an improving effect of the star polymer on the colorability of the ink on plain paper cannot be sufficiently obtained in some cases.

The star polymer used in the present invention contains at least a unit derived from at least one monomer selected from aromatic (meth)acrylates and aromatic (meth)acrylamides as a first monomer. The mass fraction of the unit derived from the first monomer in the star polymer is preferably 30.0 mass % or more and 85.0 mass % or less with reference to the total mass of the star polymer. When the mass fraction is less than 30.0 mass %, the adsorbing force of the star polymer to the surface of the pigment is insufficient, so the storage stability of the pigment ink cannot be sufficiently obtained in some cases. On the other hand, when the mass fraction exceeds 85.0 mass %, the water solubility of the star polymer reduces, so the dispersion stability of the pigment cannot be sufficiently obtained in some cases.

The star polymer used in the present invention contains at least a unit derived from an acid monomer or a salt thereof as a second monomer. The fraction of the unit derived from the second monomer in the star polymer can be represented in terms of the acid value of the star polymer. In the present invention, the star polymer has an acid value of preferably 30 mgKOH/g or more and 250 mgKOH/g or less, or more preferably 50 mgKOH/g or more and 150 mgKOH/g or less. When the acid value falls short of the preferred range of the acid value, the dispersion stability of the pigment and the ejection stability of the ink cannot be sufficiently obtained in some cases. In addition, when the acid value exceeds this range, the adsorbing force of the star polymer to the surface of the pigment may reduce, and further, the ink cannot obtain sufficient colorability or sufficient bleeding resistance on plain paper owing to a reduction in aggregating performance of the pigment in some cases.

The mass fraction of the total mass of the first monomer and the second monomer in the star polymer used in the present invention is preferably 40.0 mass % or more and 100.0 mass % or less with reference to the total mass of the arms in the star polymer. When the mass fraction falls within the above range, the balance between the adsorbing force of the star polymer to the surface of the pigment and the dispersion stability of the pigment can be made particularly suitable.

The pH of the ink of the present invention is preferably adjusted to fall within a neutral to alkaline range in order that the dispersion of the pigment is stabilized with an electrostatic repulsive force of an anion produced by neutralizing an acidic group in the star polymer as described above. In this case, however, the ink may cause the corrosion of various members used in an ink jet recording apparatus, so the pH is preferably adjusted to fall within the range of 7 to 10. A pH adjustor used in this case is, for example, any one of the following substances: various organic amines such as diethanolamine and triethanolamine; inorganic alkaline agents such as hydroxides of alkali metals including sodium hydroxide, lithium hydroxide, and potassium hydroxide; organic acids; and mineral acids. Such a star polymer as described above is dispersed or dissolved in an aqueous medium.

The content (mass %) of the star polymer in the ink is preferably 0.1 mass % or more and 15.0 mass % or less with reference to the total mass of the ink. In particular, when the star polymer is used as a dispersion polymer for the pigment, the content (mass %) of the star polymer in the ink is preferably 0.1 mass % or more and 5.0 mass % or less with reference to the total mass of the ink. It should be noted that a natural resin such as rosin, shellac, or starch, or a synthetic resin except the star polymer can be used as another dispersion polymer in combination with the above dispersion polymer to such an extent that the achievement of the objects of the present invention is not inhibited. The content of the resin except the star polymer in that case is preferably at most about the content of the star polymer.

(Pigment)

The coloring material used in the ink of the present invention is pigment, and the pigment is particularly preferably dispersed in an aqueous medium with the star polymer described above. The content (mass %) of the pigment in ink is preferably 1.0 mass % or more and 20.0 mass % or less, or more preferably 2.0 mass % or more and 12.0 mass % or less with reference to the total mass of the ink. Carbon black or an organic pigment is preferably used as the pigment. One pigment may be used alone, or two or more kinds of pigments may be used in combination.

As the black pigment, it is preferred to use carbon black such as furnace black, lamp black, acetylene black, and channel black as the pigment. The carbon black preferably has characteristics including a primary particle diameter of 11 nm or more and 40 nm or less, a specific surface area by the BET method of 50 $m^2/g$ or more and 400 $m^2/g$ or less, a volatile content of 0.5 mass % or more and 10 mass % or less, and a pH value of 2 to 10. As the black pigment, commercially available products and the like can be used.

In addition, carbon black newly prepared can also be used as the black pigment. Other than carbon black, a magnetic substance fine particle such as magnetite or ferrite, titanium black, or the like may also be used as the black pigment.

As the organic pigment, there is no particular limitation and a known organic pigment can be used. Specific examples thereof include organic pigments represented by color index (C.I.) numbers.

(Aqueous Medium)

The ink used in the present invention preferably contains an aqueous medium which is a mixed medium of water and a water-soluble organic solvent. Ion-exchanged water (deionized water) is preferably used as water instead of general water containing various ions. The water content (mass %) in the ink is preferably 10.0 mass % or more and 90.0 mass % or less, or more preferably 30.0 mass % or more and 80.0 mass % or less with reference to the total mass of the ink. In addition, the content (mass %) of the water-soluble organic solvent in the ink is preferably 3.0 mass % or more and 50.0 mass % or less, or more preferably 3.0 mass % or more and 40.0 mass % or less with reference to the total mass of the ink.

As the water-soluble organic solvent, there can be used a known water-soluble organic solvent that can be used for an ink jet ink.

(Other Components)

An additive such as a surfactant, a defoaming agent, or an antiseptic as well as the above components can be appropriately added as required to the ink of the present invention in order that the ink has desired physical property values. The content (mass %) of such additive in the ink is preferably 0.05 mass % or more and 10.0 mass % or less, or more preferably 0.2 mass % or more and 5.0 mass % or less with reference to the total mass of the ink.

(Method of Preparing Ink)

A method of preparing the ink of the present invention formed of such components as described above can be such a method as described below. First, the pigment is added to a mixture obtained by mixing at least a star polymer and water, and the contents are mixed and stirred. After that, the mixture is subjected to a dispersion treatment with a dispersing unit, and is then subjected to a centrifugation treatment as required so that a pigment dispersion liquid can be obtained. Further, for example, an aqueous medium or any such appropriately selected additive as listed above is added as required to the pigment dispersion liquid, and the mixture is stirred. Thus, the ink of the present invention is obtained.

It should be noted that the dispersion stability of the ink can be additionally improved by adding a base for dissolving the star polymer used in the present invention upon preparation of the pigment dispersion liquid. Examples of the base include: organic amines such as monoethanolamine, diethanolamine, triethanolamine, amine methyl propanol, and ammonia; and inorganic bases such as potassium hydroxide, sodium hydroxide, and lithium hydroxide.

As described above, the ink of the present invention is prepared by using the pigment dispersion liquid obtained through the dispersion treatment. Prior to the dispersion treatment performed upon preparation of the pigment dispersion liquid, performing a premixing operation in which the pigment is added to the mixture obtained by mixing at least the star polymer and water is effective. That is, such premixing operation is preferable because the wettability of the surface of the pigment can be improved, and the adsorption of a dispersant to the surface of the pigment can be promoted.

Any dispersing machine as generally used can be used in the above-mentioned dispersing treatment of pigments. Examples of the dispersing machine include a ball mill, a roll mill, a sand mill, a beads mill, and an ultra-high pressure homogenizer. Of those, the beads mill and the ultra-high pressure homogenizer are preferably used. Specific examples of those dispersers include SUPER MILL, SUPER APEX MILL, NANOMISER, AGITATOR MILL, GLEN MILL, DYNO MILL, PEARL MILL, and COBOL MILL (all of which are trade names).

In order that the ink of the present invention is suitably usable in an ink jet recording method, a pigment having an optimum particle size distribution is preferably used from the viewpoint of, for example, the resistance of a recording head against clogging with the ink. A method of obtaining a pigment having a desired particle size distribution is, for example, any one of the following approaches: an approach involving reducing the size of the pulverization medium of any such dispersing machine as listed above; an approach involving increasing the filling rate of the pulverization medium; an approach involving lengthening the treatment time; an approach involving performing classification with a filter, a centrifugal separator, or the like after pulverization; an approach involving increasing the number of times of treatment with an ultra-high pressure homogenizer or increasing the pressure at which the treatment is performed; and a combination of two or more of those approaches.

<Ink Set>

An ink set of the present invention is an ink set formed of multiple inks. The ink set is characterized in that the ink set is obtained by combining the ink (pigment ink) of the present invention containing at least the pigment and the star polymer described above, and an ink (dye ink) containing at least a dye. The ink set of such constitution can provide not only an effect obtained by the pigment ink but also an image excellent particularly in bleeding resistance between images formed with the multiple inks. The ink set of the present invention is particularly suitably an ink set for use in ink jet recording, in other words, an ink jet ink set. The ink set of the present invention may be further combined with an ink of any other constitution in addition to the pigment ink described above. Examples of such ink include a pigment ink free of any star polymer and an ink containing both a dye and a pigment as coloring materials.

Any one of the components that can be incorporated into the ink of the present invention described above can be used as a component of which the dye ink of which the ink set is formed is formed on condition that the dye is used as a coloring material. Any one of the conventionally known dyes can be used as the dye, and a pigment as well as the dye can also be used.

In the present invention, each of the following cases where ink cartridges storing the respective inks are used in combination can also be given as an example of the ink set: the case where an ink cartridge integrally storing a cyan ink, a magenta ink, a yellow ink, and a black ink is used; and the case where an ink cartridge integrally storing a cyan ink, a magenta ink, and a yellow ink is used in combination with another ink cartridge storing a black ink. Further, specific examples of the case where multiple independent ink cartridges are used in combination in the ink set include: the case where independent ink cartridges each storing a cyan ink, a magenta ink, or a yellow ink are used in combination with another ink cartridge storing a black ink; the case where ink cartridges each storing a black ink, a pale cyan ink, or a pale magenta ink are used in combination; the case where a single ink cartridge storing a red ink is used in addition to the above ink cartridges; the case where a single ink cartridge storing a green ink is used in addition to the above ink cartridges; and the case where a single ink cartridge storing a blue ink is used in addition to the above ink cartridges. Of course, the present invention is not limited to those cases.

<Set of Ink and Reaction Liquid>

The ink of the present invention is preferably used in combination with a reaction liquid having the following action to serve as a set of the ink and the reaction liquid: upon contact with the ink on a recording medium, the reaction liquid increases the average particle size of the pigment in the ink, that is, destabilizes the dispersed state of the pigment in the ink. A recorded article having an additionally high image density or additionally high color developing performance can be obtained by performing recording with the set of the ink and the reaction liquid. Hereinafter, the reaction liquid used in the present invention is described.

(Reaction Agent)

A compound (reaction agent) used in the reaction liquid having an action of increasing the average particle size of the pigment in the ink, that is, destabilizing the dispersed state of the pigment in the ink is, for example, a polyvalent metal ion or a cationic polymer. Any such reaction agent reacts with the pigment in the ink to exert an action of increasing the average particle size of the pigment, that is, destabilizing the dispersed state of the pigment.

Specific examples of a polyvalent metal ion include: divalent metal ions such as $Ca^{2+}$, $Cu^{2+}$, $Ni^{2+}$, $Zn^{2+}$, $Sr^{2+}$, and $Ba^{2+}$; and trivalent metal ions such as $Fe^{3+}$, $Al^{3+}$, $Cr^{3+}$, and $Y^{3+}$. In order to incorporate the polyvalent metal ion into a reaction liquid, a polyvalent metal salt is used. The polyvalent metal salt refers to a salt formed of each of the polyvalent metal ions listed above and an anion bonded to the ion, which needs to be soluble in water. Examples of a preferable anion for forming a salt include $Cl^-$, $NO_3^-$, $I^-$, $Br^-$, $ClO_3^-$, $SO_4^{2-}$, $CO_3^{2-}$, $CH_3COO^-$, and $HCOO^-$. The content (mass %) of the polyvalent metal ion in the reaction liquid is preferably 0.01 mass % or more and 10.0 mass % or less with reference to the total mass of the reaction liquid.

Specific examples of the cationic polymer include polyallylamine, polyethyleneimine, an epichlorohydrin/dimethylamine polymer, polydimethyldiallylammonium chloride, a dicyandiamide/diethylenetriamineammonium chloride condensate, and a guanidinium formaldehyde condensate. The content (mass %) of cationic polymers in a reaction solution is preferably 0.01 mass % or more and 10.0 mass % or less with reference to the total mass of the reaction solution.

(Aqueous Medium)

The reaction liquid used in the present invention preferably contains an aqueous medium which is a mixed medium of water and a water-soluble organic solvent. Ion-exchanged water (deionized water) is preferably used as water instead of general water containing various ions. The water content (mass %) in the reaction liquid is preferably 25.0 mass % or more and 95.0 mass % or less with reference to the total mass of the reaction liquid. In addition, the content (mass %) of the water-soluble organic solvent in the reaction liquid is preferably 5.0 mass % or more and 60.0 mass % or less, or more preferably 5.0 mass % or more and 40.0 mass % or less with reference to the total mass of the ink. Any one of the solvents that can be incorporated into the ink described above can be used as the water-soluble organic solvent used in the reaction liquid.

(Other Components)

An additive such as a surfactant, a viscosity modifier, a pH adjustor, an antiseptic, or an antioxidant may be further appropriately blended as required into the reaction liquid used in the present invention. Selection and the addition amount of a surfactant functioning as a permeation promoter are preferably determined in such a proper manner that the permeability of the reaction liquid for a recording medium is suppressed. Further, the reaction liquid used in the present invention is more preferably colorless; the reaction liquid may be of such a pale color that the reaction liquid does not change the color tone of the ink upon contact and mixing with the ink on the recording medium. Further, the viscosity at 25° C. of the reaction liquid is preferably adjusted to fall within the range of 1 mPa·s or more to 30 mPa·s or less.

(Method of Applying Reaction Liquid)

A method of applying the reaction liquid used in the present invention to a recording medium is, for example, a method of using an ink jet recording system as in the case of the ink or a method of applying the reaction liquid to the recording medium with a roller or the like. In the present invention, the reaction liquid is particularly preferably applied so that at least a region where the ink is applied can be included on the recording medium. In addition, the order of application of the reaction liquid and the ink to the recording medium is arbitrary; the ink is particularly preferably applied after the reaction liquid has been applied in advance.

<Ink Jet Recording Method>

An ink jet recording method of the present invention includes ejecting ink according to an ink jet system to perform recording on a recording medium, and is characterized in that the ink used in the ink jet recording method is the ink of the present invention. Examples of the ink jet system used in the ink jet recording method of the present invention include a recording method involving applying mechanical energy to ink to eject the ink and a recording method involving applying thermal energy to ink to eject the ink. An ink jet recording method involving the utilization of thermal energy can be particularly preferably used in the present invention.

<Ink Jet Recording Apparatus>

An ink jet recording apparatus of the present invention includes an ink storage portion for storing ink and a recording head for ejecting the ink, and is characterized in that the ink stored in the ink storage portion is the ink of the present invention. An additionally significant effect can be obtained particularly when the ink jet recording apparatus is such that the recording head ejects the ink by applying thermal energy to the ink.

Hereinafter, the schematic constitution of the mechanism portion of the ink jet recording apparatus is described. FIG. 1 is a perspective view of an ink jet recording apparatus. The ink jet recording apparatus is formed of a sheet feeding portion, a conveying portion, a carriage portion, a sheet discharge portion, a cleaning portion, and an external packaging portion M7030 for protecting them and providing them with designs to achieve a role of each mechanism. The ink jet recording apparatus includes a sheet feeding tray M2060 constituting the sheet feeding portion and a sheet discharge tray M3160 constituting the sheet discharge portion. The sheet feeding portion, the conveying portion, the carriage portion, the sheet discharge portion, and the cleaning portion are not particularly limited and any usable one can be used.

(Constitution of Recording Head)

Figure 2:
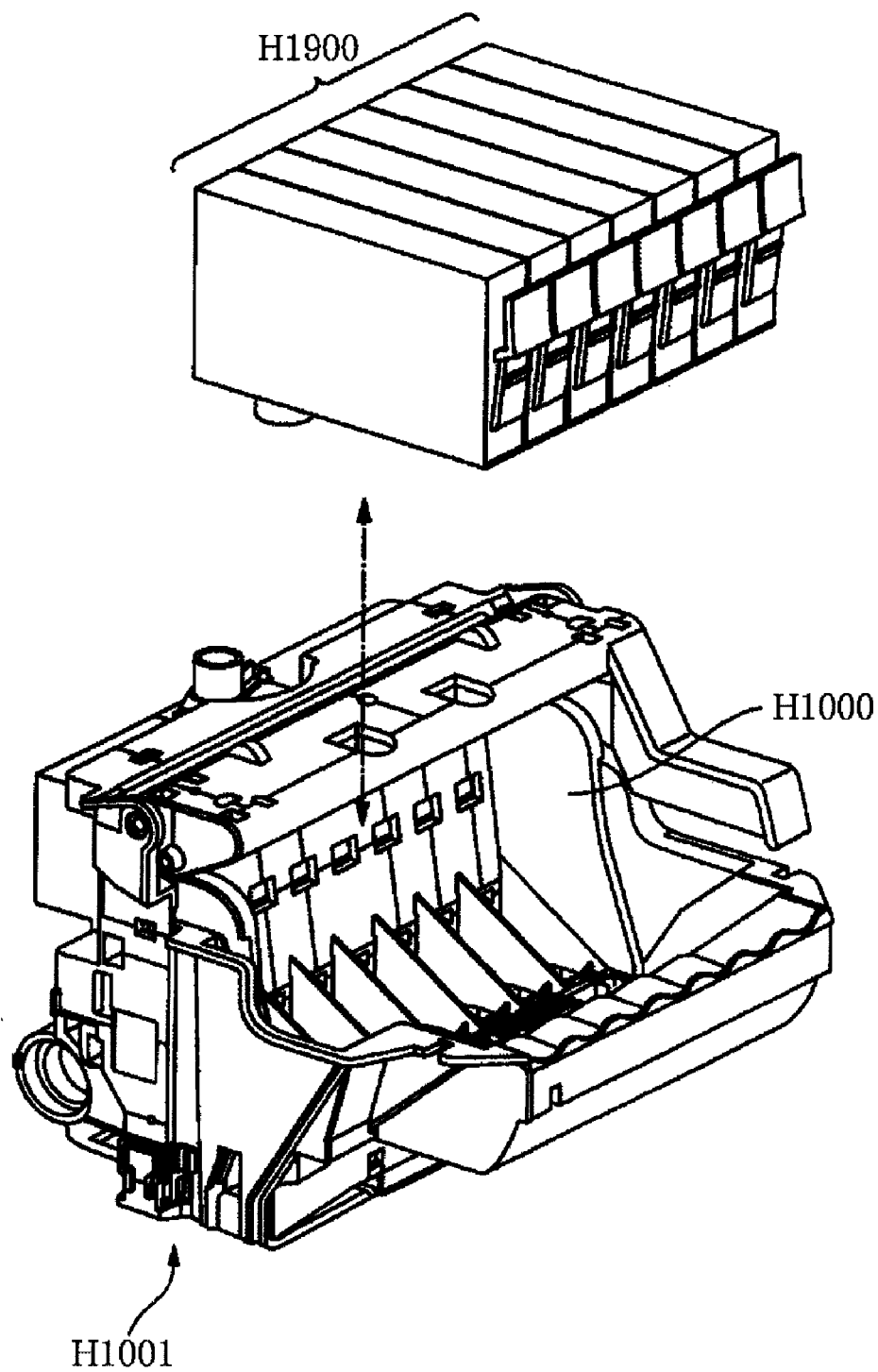
FIG. 2 is a perspective view illustrating a state where an ink cartridge is mounted on a head cartridge.

The constitution of a head cartridge H1000 is described (see FIG. 2). The head cartridge H1000 has a recording head H1001, a unit for mounting ink cartridges H1900, and a unit for supplying ink from the ink cartridges H1900 to the recording head, and the head cartridge H1000 is attachably and detachably mounted on a carriage.

FIG. 2 is a view illustrating the manner in which the ink cartridges H1900 are mounted on the head cartridge H1000. The ink jet recording apparatus forms an image with, for example, seven kinds of inks. Therefore, the ink cartridges H1900 are also independently prepared for seven colors. In addition, as illustrated in FIG. 2, each ink cartridge is removable from the head cartridge H1000. It should be noted that the ink cartridges H1900 can be attached or detached in a state where the head cartridge H1000 is mounted on a carriage.

The ink jet recording apparatus is not limited to an apparatus in which a recording head and an ink cartridge are separated, and an apparatus in which the recording head and the ink cartridge are integrated so as to be unseparable may be used as the apparatus. Further, the ink cartridge may be separably or unseparably integrated with the recording head to be mounted on the carriage, or may be provided for a fixed site of the ink jet recording apparatus to supply ink to the recording head through an ink supply member such as a tube. In addition, when the ink cartridge is provided with a constitution for applying a preferable negative pressure to the recording head, for example, the following constitution can be adopted: an absorber is placed in an ink storage portion of the ink cartridge, or the ink cartridge has a flexible ink storage bag and a spring portion that applies, to the bag, a bias in the direction in which the internal volume of the bag is expanded. In addition, the ink jet recording apparatus may adopt such a serial recording system as described above, or may be in the form of a line printer obtained by aligning recording elements over the range corresponding to the entire width of a recording medium.

EXAMPLES

Hereinafter, the present invention is described more specifically by way of examples and comparative examples. It should be noted that, in the following description, the terms "part(s)" and "%" mean "part(s) by mass" and "mass %", respectively, unless otherwise stated.
MEK: methylethylketone
IPA: ispropanol
THF: tetrahydrofuran
BzMA: benzylmethacrylate
BzMAm: N-benzylmethacrylamide
nBA: n-butylacrylate
nBMA: n-butylmethacrylate
tBMA: t-butylmethacrylate
AA: acrylic acid
St: styrene
2EHA: 2-ethylhexylacrylate
HEA: 2-hydroxyethylacrylate
MAA: methacrylic acid
EGDMA: ethylene glycol dimethacrylate
P-1M: light ester P-1M (manufactured by KYOEISHA CHEMICAL Co., LTD.)
SA: NK ester SA (manufactured by Shin-nakamura Chemical Corporation)
DPMP: dipentaerythritol hexakis(3-mercaptopropionate) (molecular weight-783)
TMMP: trimethylolpropanetris (3-mercaptopropionate) (molecular weight=399)
PEMG: pentaerythritol tetrakis(2-mercaptoglycolate) (molecular weight=405)
PEMP: pentaerythritol tetrakis(3-mercaptopropionate) (molecular weight=489)
TPMP: tripentaerythritol octakis(3-mercaptopropionate) (molecular weight=1,077)
V-59: 2,2'-azobis(2-methylbutyronitrile) (manufactured by Wako Pure Chemical Industries, Ltd.)
tBuLi: tert-butyllithium
sBuLi: sec-butyllithium
PEG 1,000: polyethylene glycol (average molecular weight=1,000)
AE 100: acetyleneglycol ethyl oxide adducts (manufactured by Kawaken Fine Chemicals Co., Ltd.)

<Preparation of Polymer Aqueous Solutions>

(Polymers 1 to 5)

First, 100 parts of MEK were put into a flask provided with a stirring apparatus, a nitrogen-introducing tube, a reflux condenser, and a temperature gauge. Next, a monomer mixed liquid obtained by mixing 65 parts of BzMA, 20 parts of nBMA, and 15 parts of AA, and 20 parts of a hexafunctional thiol DPMP as a central compound to serve as the central skeleton of a polymer were added to the flask. After that, the temperature in the flask was increased to 80° C. under a nitrogen atmosphere while the mixture was stirred. After confirming that the temperature in the flask reached 80° C., 0.3 part of V-59 was added to the mixture, and the whole was stirred for 3 hours. After that, 0.1 part of V-59 was further added to the resultant, and the whole was continuously subjected to a reaction for 2 hours. The molecular weight of a polymer 1 as a star polymer thus obtained was measured. The measurement was performed with polystyrene as a standard substance and tetrahydrofuran as a solvent by connecting a multi-angle light scattering-measuring apparatus (DAWN HELEOS; manufactured by Wyatt) to a gel permeation chromatograph provided with a differential refractometer (manufactured by TOSOH CORPORATION). The polymer had a number-average molecular weight Mn of 4,000, a weight-average molecular weight Mw of 5,000, a molecular weight distribution (Mw/Mn) of 1.25, and an absolute molecular weight of 5,600. The number-average molecular weight of the respective arms can be determined to be 800 by the following procedure: the molecular weight of a portion obtained by removing six hydrogen atoms from the central skeleton DPMP, i.e., 777 is subtracted from the absolute molecular weight of the star polymer, and the resultant value is divided by the number of arms, i.e., six. It should be noted that the fact that six arms were bonded to the central skeleton was attributed to the confirmation of the disappearance of the absorption of a thiol (S—H bond) (around 2,570 cm$^{-1}$) with a Raman spectrometer (manufactured by JASCO Corporation).

In addition, the polymer was fractionated into a 0-to-50% portion and a 50%-to-100% portion on a mass basis in correspondence with the peak of the polymer observed with the above differential refractometer. Each portion was concentrated under reduced pressure and dried in a vacuum. After that, the ratio between BzMA as a first monomer (chemical shift value δ of the aromatic ring: 7 to 8) and AA as a second monomer (chemical shift value δ of the carboxyl group: 12 to 13) was determined by proton nuclear magnetic resonance (¹H-NMR) spectrometry. As a result, the ratio [M₁(50)/M₂(50)]/[M₁(100)/M₂(100)] (hereinafter referred to as "R") was 1.0.

The resultant polymer 1 had an acid value of 97 mgKOH/g. An equivalent molar amount of KOH with respect to the acid value of the polymer 1 and an appropriate amount of water were added to a solution of the polymer in MEK, and the mixture was stirred. After that, MEK was removed under a reduced pressure condition, and water was added to the remainder. Thus, a 25% polymer aqueous solution 1 was obtained.

Polymers 2 to 5 in each of which the number average molecular weight of the arms was changed were each synthesized in the same manner as in the polymer 1 except that the proportion of the central compound to the total amount of the monomers used in the polymer 1 was changed. Table 1 below shows the respective physical properties of the polymers 1 to 5 collectively.

TABLE 1

|  | Polymer | | | | |
| --- | --- | --- | --- | --- | --- |
|  | 1 | 2 | 3 | 4 | 5 |
| Number-average molecular weight (Mn) | 4,000 | 2,000 | 2,200 | 9,700 | 10,000 |
| Weight-average molecular weight (Mw) | 5,000 | 2,500 | 2,700 | 13,100 | 14,000 |
| Molecular weight distribution (Mw/Mn) | 1.25 | 1.25 | 1.23 | 1.35 | 1.40 |
| Absolute molecular weight | 5,600 | 2,900 | 3,200 | 18,800 | 19,400 |
| Number-average molecular weight of arms (Mn) | 800 | 350 | 400 | 3,000 | 3,100 |
| Acid value [mgKOH/g] | 97 | 83 | 87 | 112 | 112 |
| R | 1.0 | 0.9 | 0.8 | 0.8 | 0.7 |

(Polymers 6 to 8)

Polymers 6 to 8 in each of which the number of arms was changed were each synthesized in the same manner as in the polymer 1 except that the central compound used in the polymer 1 was changed. Table 2 below shows the respective physical properties of the polymers 6 to 8. It should be noted that the central compound of the polymer 8 was produced by employing the method described in Example 1 of Japanese Patent Application Laid-Open No. 2002-128898. Here, a nonafunctional thiol compound (9SH) obtained by causing 3-mercaptopropionic acid to react with each of the nine hydroxyl groups of a Polyglycerin #500 (product name: manufactured by SAKAMOTO YAKUHIN KOGYO CO., LTD.) was used. It should be noted that Table 2 shows the respective physical properties of the polymer 1 synthesized in the foregoing as well.

TABLE 2

|  | Polymer | | | |
| --- | --- | --- | --- | --- |
|  | 1 | 6 | 7 | 8 |
| Central compound | DPMP | TMMP | TPMP | 9SH |
| Number of arms | 6 | 3 | 8 | 9 |
| Number-average molecular weight (Mn) | 4,000 | 2300 | 6,000 | 7,200 |
| Weight-average molecular weight (Mw) | 5,000 | 3,100 | 7,800 | 9,500 |

TABLE 2-continued

|  | Polymer | | | |
| --- | --- | --- | --- | --- |
|  | 1 | 6 | 7 | 8 |
| Molecular weight distribution (Mw/Mn) | 1.25 | 1.35 | 1.30 | 1.32 |
| Absolute molecular weight | 5,600 | 2,800 | 7,500 | 8,600 |
| Number-average molecular weight of arms (Mn) | 800 | 800 | 800 | 800 |
| Acid value [mgKOH/g] | 97 | 83 | 87 | 112 |
| R | 1.0 | 0.8 | 0.8 | 0.9 |

(Polymers 9 and 10)

Polymers 9 and 10 in each of which the molecular weight distribution was changed were each synthesized in the same manner as in the polymer 1 except that the polymerization temperature was changed, using the monomers and central compound of the polymer 1. Table 3 below shows the respective physical properties of the polymers 9 and 10. It should be noted that Table 3 shows the respective physical properties of the polymer 1 synthesized in the foregoing as well.

TABLE 3

|  | Polymer | | |
| --- | --- | --- | --- |
|  | 1 | 9 | 10 |
| polymerization temperature [° C.] | 80 | 70 | 60 |
| Number-average molecular weight (Mn) | 4,000 | 3,800 | 3,800 |
| Weight-average molecular weight (Mw) | 5,000 | 5,700 | 5,900 |
| Molecular weight distribution (Mw/Mn) | 1.25 | 1.50 | 1.55 |
| Absolute molecular weight | 5,600 | 6,200 | 6,200 |
| Number-average molecular weight of arms (Mn) | 800 | 900 | 900 |
| Acid value [mgKOH/g] | 97 | 97 | 97 |
| R | 1.0 | 0.8 | 0.7 |

(Polymers 11 to 13)

Polymers 11 to 13 of various monomer were each synthesized in the same manner as in the polymer 1 except that the monomers to be copolymerized were changed. Table below shows the respective physical properties of the polymers 11 to 13. It should be noted that Table 4 shows the respective physical properties of the polymer 1 synthesized in the foregoing as well.

TABLE 4

| | Polymer | | | |
|---|---|---|---|---|
| | 1 | 11 | 12 | 13 |
| Monomers to be copolymerized | BzMA/ nBMA/AA | BzMAm/ nBMA/ P-1M | BzMAm/ nBMA/SA | BzMAm/ nBMA/AA |
| Composition fraction (mass fraction) | 65/20/15 | 56/17/27 | 41/11/48 | 65/20/15 |
| Number-average molecular weight (Mn) | 4,000 | 4,000 | 3,900 | 3,800 |
| Weight-average molecular weight (Mw) | 5,000 | 5,500 | 5,300 | 5,100 |
| Molecular weight distribution (Mw/Mn) | 1.25 | 1.38 | 1.36 | 1.34 |
| Absolute molecular weight | 5,600 | 5,600 | 5,600 | 5,600 |
| Number-average molecular weight of arms (Mn) | 800 | 800 | 800 | 800 |
| Acid value [mgKOH/g] | 97 | 96 | 97 | 97 |
| R | 1.0 | 1.3 | 1.2 | 1.1 |

(Polymers 14 to 17)

Polymers 14 to 17 are each a star polymer the central skeleton of which is not a sulfur-containing compound. Those polymers were each synthesized by the polymerization method described in J. Polym. Sci., Part A: Polym. Chem., 2006, 44, 6659.

Monomers used were 63 parts of BzMAm, 20 parts of nBMA, and 17 parts of tBMA, and each substance in the following table was used as an initiator. After the polymerization, hydrochloric acid and methanol were added to terminate the polymerization reaction, and the t-butyl group of copolymerized tBMA was hydrolyzed so that tBMA was turned into methacrylic acid. Thus, a carboxyl group was obtained. The scheme in Table 5 below is such that the central compound used upon synthesis of each polymer is indicated with the scheme number described in the above mentioned document. Table 6 below shows the respective physical properties of the polymers 14 to 17.

TABLE 5

| | Polymer | | | |
|---|---|---|---|---|
| | 14 | 15 | 16 | 17 |
| Scheme | 17 | 17 | 15 | 15 |
| Number of arms | 16 | 16 | 4 | 4 |
| Initiator | tBuLi | tBuLi | tBuLi | tBuLi |

TABLE 6

| | Polymer | | | |
|---|---|---|---|---|
| | 14 | 15 | 16 | 17 |
| Number-average molecular weight (Mn) | 50,000 | 7,500 | 8,000 | 3,500 |
| Weight-average molecular weight (Mw) | 95,000 | 12,000 | 14,000 | 4,000 |
| Molecular weight distribution (Mw/Mn) | 1.90 | 1.60 | 1.75 | 1.14 |

TABLE 6-continued

| | Polymer | | | |
|---|---|---|---|---|
| | 14 | 15 | 16 | 17 |
| Absolute molecular weight | 250,000 | 37,000 | 8,700 | 8,700 |
| Number-average molecular weight of arms (Mn) | 15,000 | 2,000 | 2,000 | 2,000 |
| Acid value [mgKOH/g] | 110 | 97 | 97 | 97 |
| R | 1.1 | 1.2 | 1.2 | 1.1 |

(Polymers 18 to 20)

First, 90 parts of MEK were put into a flask provided with a stirring apparatus, a nitrogen-introducing tube, a reflux condenser, and a temperature gauge. Then, the temperature in the flask was increased to 80° C. under a nitrogen atmosphere. Next, a solution obtained by mixing 65 parts of BzMA, 20 parts of nBA, 15 parts of AA, and 12 parts of a tetrafunctional thiol PEMP as a central compound to serve as the central skeleton of a polymer was dropped into the flask over 2 hours, and at the same time, a polymerization initiator solution prepared by dissolving 0.3 part of V-59 in 10 parts of MEK was dropped into the flask over 3 hours. Then, the mixture was continuously subjected to a reaction for 2 hours. When polymerization is performed while the monomer mixed liquid is dropped to a polymerization solvent optimum for the copolymerization of monomers like this synthesis method, the polymerization is uniformly performed in a dilute system, so the value R can be brought close to 1 (composition distribution depending on molecular weight can be made small).

The resultant polymer 18 had an acid value of 104 mgKOH/g. An equivalent molar amount of KOH with respect to the acid value of the polymer 18 and an appropriate amount of water were added to a solution of the polymer in MEK, and the mixture was stirred. After that, MEK was removed under a reduced pressure condition, and water was added to the remainder. Thus, a 25% polymer aqueous solution 18 was obtained.

Polymers 19 and 20 in each of which the ratio $[M_1(50)/M_2(50)]/[M_1(100)/M_2(100)]$ was changed were each synthesized in the same manner as in the polymer 18 except that at least one of the polymerization solvent and the polymerization temperature was changed while the same monomers and central compound as those of the polymer 18 were used. Table 7 below shows the respective physical properties of the polymers 18 to 20.

TABLE 7

| | Polymer | | |
|---|---|---|---|
| | 18 | 19 | 20 |
| Polymerization solvent | MEK | IPA | THF |
| Polymerization temperature [° C.] | 80 | 80 | 60 |
| Number-average molecular weight (Mn) | 4,000 | 4,000 | 4,000 |
| Weight-average molecular weight (Mw) | 5,800 | 5,800 | 6,100 |
| Molecular weight distribution (Mw/Mn) | 1.45 | 1.45 | 1.53 |
| Absolute molecular weight | 5,000 | 5,000 | 5,100 |
| Number-average molecular weight of arms (Mn) | 1,100 | 1,100 | 1,200 |
| Acid value [mgKOH/g] | 104 | 104 | 104 |
| R | 1.0 | 0.8 | 1.2 |

(Polymers 21 to 24)

Polymers 21 to 24 in each of which the number-average molecular weight (Mn) was changed were each synthesized in the same manner as in the polymer 18 except that the proportion of the central compound to the total amount of the monomers used in the polymer 18 was changed. Table 8 below shows the respective physical properties of the polymers 21 to 24.

TABLE 8

|  | Polymer | | | |
|---|---|---|---|---|
|  | 21 | 22 | 23 | 24 |
| Number-average molecular weight (Mn) | 1,900 | 2,000 | 10,000 | 11,000 |
| Weight-average molecular weight (Mw) | 2,850 | 3,000 | 15,000 | 17,000 |
| Molecular weight distribution (Mw/Mn) | 1.50 | 1.50 | 1.50 | 1.55 |
| Absolute molecular weight | 3,000 | 3,200 | 11,000 | 13,000 |
| Number-average molecular weight of arms (Mn) | 400 | 400 | 2,700 | 3,000 |
| Acid value [mgKOH/g] | 112 | 112 | 112 | 112 |
| R | 1.2 | 1.2 | 1.0 | 1.1 |

(Polymers 25 and 26)

Polymers 25 and 26 different in Mn were each synthesized in the same manner as in the polymer 18 except that: the central compound used in the polymer 18 was changed to TMMP, and the proportion of the central compound to the total amount of the monomers used in the polymer 18 was changed. Table 9 below shows the respective physical properties of the polymers 25 and 26.

TABLE 9

|  | Polymer | |
|---|---|---|
|  | 25 | 26 |
| Number-average molecular weight (Mn) | 1,000 | 900 |
| Weight-average molecular weight (Mw) | 1,300 | 1,200 |
| Molecular weight distribution (Mw/Mn) | 1.30 | 1.33 |
| Absolute molecular weight | 1,600 | 1,400 |
| Number-average molecular weight of arms (Mn) | 400 | 350 |
| Acid value [mgKOH/g] | 83 | 81 |
| R | 1.0 | 1.0 |

(Polymers 27 and 28)

Polymers 27 and 28 with different R were each synthesized in the same manner as in the polymerization method for the polymer 1 except the following points. First, 100 parts of IPA were put as a polymerization solvent at the time of the synthesis of the polymer 27, and 100 parts of THF were put as a polymerization solvent at the time of the synthesis of the polymer 28. Next, a monomer mixed liquid obtained by mixing 65 parts of BzMA, 20 parts of nBA, and 15 parts of AA, and 12 parts of a tetrafunctional thiol PEMP as a central compound to serve as the central skeleton of a polymer were added to the flask. After that, the temperature in the flask was increased to 70° C. in the case of the polymer 27 or 60° C. in the case of the polymer 28 under a nitrogen atmosphere while the mixture was stirred. After confirming that the temperature in the flask reached the set temperature, 0.3 part of V-59 was added to the mixture, and the whole was stirred for 3 hours. After that, 0.1 part of V-59 was further added to the resultant, and the whole was continuously subjected to a reaction for 2 hours. Subsequently, the polymers 27 and 28 having different R were synthesized in the same manner as in the case of the polymer 1. Table 10 below shows the respective physical properties of the polymers 27 and 28.

TABLE 10

|  | Polymer | |
|---|---|---|
|  | 27 | 28 |
| Number-average molecular weight (Mn) | 4,200 | 4,400 |
| Weight-average molecular weight (Mw) | 6,300 | 6,800 |
| Molecular weight distribution (Mw/Mn) | 1.50 | 1.55 |
| Absolute molecular weight | 4,800 | 5,200 |
| Number-average molecular weight of arms (Mn) | 1,100 | 1,200 |
| Acid value [mgKOH/g] | 104 | 104 |
| R | 0.7 | 1.3 |

(Polymers 29 to 34)

Polymers 29 to 34 with different acid values were each synthesized in the same manner as in the polymer 1 except that the composition fraction (mass fraction) of the monomers to be copolymerized for the polymer 1 was changed as shown in Table 11 below. Table 11 below shows the respective physical properties of the polymers 29 to 34. It should be noted that Table 11 shows the respective physical properties of the polymer 1 synthesized in the foregoing as well.

TABLE 11

|  |  | Polymer | | | | | | |
|---|---|---|---|---|---|---|---|---|
|  |  | 1 | 29 | 30 | 31 | 32 | 33 | 34 |
| Composition fraction (mass fraction) | BzMA | 65 | 75.4 | 72.5 | 72.3 | 56.9 | 56.7 | 41.5 |
|  | BMA | 20 | 20 | 20 | 20 | 20 | 20 | 20 |
|  | AA | 15 | 4.6 | 7.5 | 7.7 | 23.1 | 23.3 | 38.5 |
| Number-average molecular weight (Mn) |  | 4,000 | 4,000 | 4,000 | 4,000 | 4,000 | 4,000 | 4,000 |
| Weight-average molecular weight (Mw) |  | 5,000 | 5,000 | 5,000 | 5,000 | 5,000 | 5,000 | 5,000 |
| Molecular weight distribution (Mw/Mn) |  | 1.25 | 1.25 | 1.25 | 1.25 | 1.25 | 1.25 | 1.25 |
| Absolute molecular weight |  | 5,600 | 5,600 | 5,600 | 5,600 | 5,600 | 5,600 | 5,600 |
| Number-average molecular weight of arms (Mn) |  | 800 | 800 | 800 | 800 | 800 | 800 | 800 |
| Acid value [mgKOH/g] |  | 97 | 30 | 49 | 50 | 150 | 151 | 250 |
| R |  | 1.0 | 1.0 | 1.0 | 1.0 | 1.0 | 1.0 | 1.0 |

(Polymers 35 to 38)

Polymers 35 to 38 with various fractions of the first monomer were each synthesized in the same manner as in the polymer 1 except that composition fraction (mass fraction) among the monomers to be copolymerized for the polymer 1 and proportion of the central compound were changed as shown in Table 12 below. Table 12 below shows the respective physical properties of the polymers 35 to 38. It should be noted that Table 12 shows the respective physical properties of the polymer 1 synthesized in the foregoing as well.

TABLE 12

|  | Polymer | | | | |
| --- | --- | --- | --- | --- | --- |
|  | 1 | 35 | 36 | 37 | 38 |
| Monomers to be copolymerized | BzMA/BMA/AA | BzMA/BMA/AA | BzMA/BMA/AA | BzMA/AA | BzMA/AA |
| Composition fraction (mass fraction) | 65/20/15 | 35/50/15 | 36/49/15 | 93/7 | 93/7 |
| Central compound to be used | DPMP: 20 parts | DPMP: 20 parts | DPMP: 20 parts | DPMP: 10 parts | DPMP: 8 parts |
| Number of arm | 6 | 6 | 6 | 6 | 6 |
| Number-average molecular weight (Mn) | 4,000 | 4,000 | 4,000 | 4,000 | 4,300 |
| Weight-average molecular weight (Mw) | 5,000 | 5,000 | 5,000 | 5,200 | 5,600 |
| Molecular weight distribution (Mw/Mn) | 1.25 | 1.25 | 1.25 | 1.30 | 1.30 |
| Absolute molecular weight | 5,600 | 5,600 | 5,600 | 9,800 | 11,600 |
| Number-average molecular weight of arms (Mn) | 800 | 800 | 800 | 1,500 | 1,800 |
| Mass fraction of first monomer to star polymer [%] | 54 | 29 | 30 | 85 | 86 |
| Acid value [mgKOH/g] | 97 | 97 | 97 | 50 | 51 |
| R | 1.0 | 1.0 | 1.0 | 1.0 | 1.0 |

(Polymers 39 and 40)

Polymers 39 and 40 with various mass fractions of the first monomer and the second monomer to the arm were each synthesized in the same manner as in the polymer 1 except that composition fraction (mass fraction) among the monomers to be copolymerized for the polymer 1 and proportion of the central compound were changed as shown in Table 13 below. Table 13 below shows the respective physical properties of the polymers 39 and 40. It should be noted that Table 13 shows the respective physical properties of the polymer 1 synthesized in the foregoing as well.

TABLE 13

|  | Polymer | | |
| --- | --- | --- | --- |
|  | 1 | 39 | 40 |
| Monomers to be copolymerized | BzMA/BMA/AA | BzMA/BMA/AA | BzMA/BMA/AA |
| Composition fraction (mass fraction) | 65/20/15 | 32/61/7 | 33/60/7 |
| Central compound to be used | DPMP: 20 parts | DPMP: 8 parts | DPMP: 10 parts |
| Number-average molecular weight (Mn) | 4,000 | 4,300 | 4,000 |
| Weight-average molecular weight (Mw) | 5,000 | 5,600 | 5,200 |
| Molecular weight distribution (Mw/Mn) | 1.25 | 1.30 | 1.30 |
| Absolute molecular weight | 5,600 | 11,600 | 9,800 |
| Number-average molecular weight of arms (Mn) | 800 | 1,800 | 1,500 |
| Mass fraction of first monomer to star polymer [%] | 59 | 30 | 30 |
| Mass fraction of first monomer and second monomer to arm [%] | 80 | 39 | 40 |
| Acid value [mgKOH/g] | 97 | 51 | 50 |
| R | 1.0 | 1.0 | 1.0 |

(Polymer 41)

A polymer 41 is a star polymer used in a comparative example of the present invention. This polymer does not contain the first monomer in any one of its copolymer chains. The polymer 41 was synthesized in the same manner as in the polymer 1 except that BzMA as the aromatic (meth)acrylate monomer of the polymer 1 was changed to St which was not an aromatic (meth)acrylate monomer. It should be noted that the R of the polymer 41 cannot be determined because the polymer does not contain the first monomer. Table 14 below shows the respective physical properties of the polymer 41.

TABLE 14

|  | Polymer 41 |
| --- | --- |
| Number-average molecular weight (Mn) | 3,500 |
| Weight-average molecular weight (Mw) | 5,200 |
| Molecular weight distribution (Mw/Mn) | 1.49 |
| Absolute molecular weight | 3,800 |
| Number-average molecular weight of arms (Mn) | 500 |
| Acid value [mgKOH/g] | 97 |

(Polymer 42)

A polymer 42 is a star polymer used in a comparative example of the present invention. In the polymer, the monomer of which each arm is formed is not an $\alpha,\beta$-ethylenically unsaturated monomer, and further, each copolymer chain of which the star polymer is formed is not a copolymer chain of the first and second monomers. The polymer was produced in accordance with the method described in Example 1 of Japanese Patent Application Laid-Open No. 2001-040256. The central compound is trihydroxybenzene, the monomer of which each arm is formed is ethylene oxide, and the number of arms is three. It should be noted that the R of the polymer 42 cannot be determined and the polymer does not have any acid value because the polymer contains neither the first monomer nor the second monomer. Table 15 below shows the respective physical properties of the polymer 42.

TABLE 15

|  | Polymer 42 |
| --- | --- |
| Number-average molecular weight (Mn) | 2,500 |
| Weight-average molecular weight (Mw) | 3,500 |
| Molecular weight distribution (Mw/Mn) | 1.40 |
| Absolute molecular weight | 3,100 |
| Number-average molecular weight of arms (Mn) | 1,000 |
| Acid value [mgKOH/g] | Absent |

(Polymer 43)

A polymer 43 is a star polymer used in a comparative example of the present invention. In this polymer, each copolymer chain of which the star polymer is formed is not a copolymer chain of the first and second monomers. The polymer was produced in accordance with the method described in Example 15 of Japanese Patent Application Laid-Open No. 2001-040256. The central compound is TMMP, the monomer of which each arm is formed is N,N-dimethylacrylamide, and the number of arms is three. It should be noted that the R of the polymer 43 cannot be determined because the polymer contains neither the first monomer nor the second monomer. Table 16 below shows the respective physical properties of the polymer 43.

TABLE 16

|  | Polymer 43 |
| --- | --- |
| Number-average molecular weight (Mn) | 1,000 |
| Weight-average molecular weight (Mw) | 1,500 |
| Molecular weight distribution (Mw/Mn) | 1.50 |
| Absolute molecular weight | 1,300 |
| Number-average molecular weight of arms (Mn) | 300 |
| Acid value [mgKOH/g] | Absent |

(Polymer 44)

A polymer 44 is a star polymer used in a comparative example of the present invention. In this polymer, each copolymer chain of which the star polymer is formed is not a copolymer chain of the first and second monomers. The polymer was produced in accordance with the method described in Reference Example 1 of Japanese Patent Application Laid-Open No. H09-249709. The central compound is PEMG, the monomers of which each arm is formed are nBA, 2EHA, and HEA, and the number of arms is four. It should be noted that the R of the polymer 44 cannot be determined and the polymer does not have any acid value because the polymer contains neither the first monomer nor the second monomer. Table 17 below shows the respective physical properties of the polymer 44.

TABLE 17

|  | Polymer 44 |
| --- | --- |
| Number-average molecular weight (Mn) | 4,500 |
| Weight-average molecular weight (Mw) | 6,800 |
| Molecular weight distribution (Mw/Mn) | 1.51 |
| Absolute molecular weight | 11,300 |
| Number-average molecular weight of arms (Mn) | 2,700 |
| Acid value [mgKOH/g] | Absent |

(Polymer 45)

A polymer 45 is a polymer used in a comparative example of the present invention, and the synthesized polymer 45 is not a star polymer, though the raw material of the polymer contains a star polymer. In other words, the copolymer chain of which such a star polymer as used in the present invention is formed is not a copolymer chain of the first and second monomers. The polymer was produced in accordance with the method described in Production Example 1 of Japanese Patent Application Laid-Open No. S59-124922. A polymer synthesized by the following procedure is not a star polymer: the molecules of a pentaerythritol polymer which is a star polymer are crosslinked with an isophorone-type isocyanate, and phthalic anhydride is added to the hydroxyl group of the pentaerythritol polymer. It should be noted that the R of the polymer 45 cannot be determined because the polymer contains neither the first monomer nor the second monomer. Table 18 below shows the respective physical properties of the polymer 45.

TABLE 18

|  | Polymer 45 |
| --- | --- |
| Number-average molecular weight (Mn) | 1,100 |
| Weight-average molecular weight (Mw) | 2,400 |
| Molecular weight distribution (Mw/Mn) | 2.18 |
| Absolute molecular weight | 11,300 |
| Number-average molecular weight of arms (Mn) | Unidentified |
| Acid value [mgKOH/g] | 20 |

(Polymer 46)

A polymer 46 is a star polymer used in a comparative example of the present invention. This star polymer does not have any central skeleton that can be isolated, and the copolymer chain of which the star polymer is formed does not contain the first monomer. The polymer was produced in accordance with the method of synthesizing a star polymer 1 described in Japanese Patent Application Laid-Open No. 2000-169771. Monomers of which each arm is formed are nBMA and MAA none of which is the first monomer. In addition, the star polymer is obtained by crosslinking the molecules of EGDMA attached to one terminal of each arm. The number of arms cannot be uniquely determined because the number cannot be controlled and has a distribution. It should be noted that the R of the polymer 46 cannot be determined because the polymer does not contain the first monomer. Table 19 below shows the respective physical properties of the polymer 46. The star polymer 46 does not have any central skeleton, like the star polymer 47 described below, and of course does not have any central skeleton that can be isolated.

TABLE 19

|  | Polymer 46 |
| --- | --- |
| Number-average molecular weight (Mn) | 20,000 |
| Weight-average molecular weight (Mw) | 28,000 |
| Molecular weight distribution (Mw/Mn) | 1.40 |
| Absolute molecular weight | 80,000 |
| Number-average molecular weight of arms (Mn) | 5,000 |
| Acid value [mgKOH/g] | 110 |

(Polymer 47)

A polymer 47 is a star polymer used in a comparative example of the present invention. The star polymer does not have any central skeleton, and of course, does not have any central skeleton that can be isolated. As in the case of the polymer 46, the method of synthesizing a star polymer 1 described in Japanese Patent Application Laid-Open No. 2000-169771 was employed for the synthesis of the polymer, and monomers of which each arm was formed were as shown in Table 20 below. The indication "BzMA/nBMA/MAA" in Table 20 below shows that the three kinds of monomers are randomly placed. In addition, the symbol "//EGDMA" in Table 20 below shows that EGDMA is copolymerized as a block to one terminal of the arm. In Japanese Patent Application Laid-Open No. 2000-169771, neither an aromatic (meth)acrylate nor an aromatic (meth)acrylamide is included in the monomers of which each arm is formed. However, the case where BzMA as an aromatic (meth)acrylate is copolymerized is described for easy performance comparison. Table 20 below shows the respective physical properties of the polymer 47.

TABLE 20

|  | Polymer 47 |
| --- | --- |
| Monomers to be copolymerized | BzMA/nBMA/MAA//EGDMA |
| Composition fraction (mass fraction) | 65/6/15//14 |
| Number-average molecular weight (Mn) | 7,000 |
| Weight-average molecular weight (Mw) | 9,000 |
| Molecular weight distribution (Mw/Mn) | 1.29 |

TABLE 20-continued

|  | Polymer 47 |
| --- | --- |
| Absolute molecular weight | 32,000 |
| Number-average molecular weight of arms (Mn) | 2,000 |
| Acid value [mgKOH/g] | 98 |
| R | 1.2 |

(Polymer 48)

A polymer 48 is a linear polymer used in a comparative example of the present invention. This polymer was synthesized by living anion polymerization in order that its molecular weight distribution was 1.5 or less. The synthesis was performed with reference to the method described in "New Polymer Experiment 2", Synthesis and Reaction of Polymer (1) Synthesis of Addition Polymer, edited by the Society of Polymer Science. The monomer composition of the linear polymer was as shown in Table 21 below. Upon polymerization, the experimental apparatus and the experimental procedure adopted were those of Experimental Example 2.4.1 described on page 212 of "New Polymer Experiment 2", Synthesis and Reaction of Polymer (1) Synthesis of Addition Polymer, edited by the Society of Polymer Science. The polymerization was performed by using 100 parts of toluene as a solvent and 2 parts of a mixture of tBuLi and tributylaluminum as an initiator at a temperature of −78° C. for a reaction time of 24 hours. After the reaction, a mixture of hydrochloric acid and methanol was added to the resultant so that a termination reaction might be performed. Simultaneously with the termination reaction, tBMA was subjected to a hydrolysis reaction so as to become MAA. After that, excessive hexane was added to the resultant so that a polymer was precipitated. Then, the polymer was dried in a vacuum. An equivalent amount of KOH with respect to the value represented by the acid value of the polymer and ion-exchanged water were added to the polymer. Thus, a 25% aqueous solution of the polymer 48 was obtained. Table 21 below shows the respective physical properties of the polymer 48.

TABLE 21

|  | Polymer 48 |
| --- | --- |
| Monomers to be copolymerized | BzMA/nBMA/tBMA |
| Composition fraction (mass fraction) | 63/20/17 |
| Number-average molecular weight (Mn) | 4,000 |
| Weight-average molecular weight (Mw) | 4,800 |
| Molecular weight distribution (Mw/Mn) | 1.20 |
| Acid value [mgKOH/g] | 98 |
| R | 1.0 |

<Preparation of Pigment Dispersion Liquids>

| (Preparation of black pigment dispersion liquids) | |
| --- | --- |
| Polymer 1 | 20 parts |
| 2-pyrrolidone | 10 parts |
| Ion-exchanged water | 55 parts |

The above components were mixed, and the mixture was heated to 70° C. in a water bath. Then, the resin component was completely dissolved in the mixture. Then, parts of carbon black (NIPex 180IQ; manufactured by Degussa Co.) was added to the resultant solution, and the contents were subjected to premixing for 30 minutes. After that, the resultant was subjected to a dispersion treatment under the following conditions. Thus, a black pigment dispersion liquid 1 was obtained.

Dispersing machine: An ultra-high pressure homogenizer NM2-L200AR (manufactured by YOSHIDA KIKAI CO., LTD.)
Treatment pressure: 150 MPa
Treatment paths: 10 paths In addition, black pigment dispersion liquids 2 to 48 were each produced in the same manner as in the black pigment dispersion liquid 1 except that each of the polymers 2 to 48 was used instead of the polymer 1 of the black pigment dispersion liquid 1.

| (Preparation of cyan pigment dispersion liquids) | |
| --- | --- |
| Polymer 1 | 20 parts |
| 2-pyrrolidone | 10 parts |
| Ion-exchanged water | 55 parts |

The above components were mixed, and the mixture was heated to 70° C. in a water bath. Then, the mixture was stirred so that the resin component was completely dissolved. Then, 15 parts of a cyan pigment (IRGALITE Blue 8700; manufactured by Ciba Specialty Chemicals Inc.) was added to the resultant solution, and the contents were subjected to premixing for 30 minutes. After that, the resultant was subjected to a dispersion treatment under the following conditions. Thus, a cyan pigment dispersion liquid 1 was obtained.

Dispersing machine: A bead mill UAM-015 (product name) (manufactured by KOTOBUKI INDUSTRIES CO., LTD.)
Beads used: Zirconia beads having a diameter of 0.05 mm
Filling rate of beads: 70% (in terms of bulk specific gravity)
Number of revolutions of the rotor: 42.1 Hz (Preparation of Magenta Pigment Dispersion Liquids)

A magenta pigment dispersion liquid was prepared in the same manner as in the above cyan pigment dispersion liquid except that the pigment in the cyan pigment dispersion liquid was changed from the cyan pigment to a magenta pigment (CROMOPHTAL Pink PT; manufactured by Ciba Specialty Chemicals Inc.).

(Preparation of Yellow Pigment Dispersion Liquids)

A yellow pigment dispersion liquid was prepared in the same manner as in the above cyan pigment dispersion liquid except that the pigment in the cyan pigment dispersion liquid was changed from the cyan pigment to a yellow pigment (IRGALITE Yellow GS; manufactured by Ciba Specialty Chemicals Inc.).

<Preparation of Inks>
(Preparation of Black Inks)

A black ink 1 was obtained by mixing the following respective components including the black pigment dispersion liquid 1 described above.

| Black pigment dispersion liquid 1 (5 parts in terms of pigment concentration) | 33 parts |
| --- | --- |
| Glycerin | 10 parts |
| Ethylene glycol | 5 parts |
| PEG 1,000 | 5 parts |
| AE 100 | 0.5 part |
| Ion-exchanged water | 46.5 parts |

In addition, black inks 2 to 48 were each prepared in the same manner as in the black ink 1 except that each of the black pigment dispersion liquids 2 to 48 was used instead of the black pigment dispersion liquid 1 of the black ink 1.

(Preparation of Cyan Inks)

A cyan ink was prepared in the same manner as in the black ink 1 except that the black pigment dispersion liquid 1 in the black ink 1 was changed to the cyan pigment dispersion liquid.

(Preparation of Magenta Inks)

A magenta ink was prepared in the same manner as in the black ink 1 except that the black pigment dispersion liquid 1 in the black ink 1 was changed to the magenta pigment dispersion liquid.

(Preparation of Yellow Inks)

A yellow ink was prepared in the same manner as in the black ink 1 except that the black pigment dispersion liquid 1 in the black ink 1 was changed to the yellow pigment dispersion liquid.

<Evaluation of Inks>
(Colorability)

Each of the black inks obtained in the foregoing was put into an ink cartridge, and the ink cartridge was mounted on an ink jet recording apparatus PIXUS iP4100 (manufactured by Canon Inc.). Then, a solid image having a recording duty of 100% was recorded on a Canon Plain Paper White SW-101 (manufactured by Canon Inc.) while the recording mode of the apparatus was set to a plain paper/standard mode. Thus, a recorded article was produced. The resultant recorded article was evaluated for its colorability by measuring the optical density $OD_1$ in a solid image portion. The optical density was measured with a reflection densitometer RD-19I (manufactured by Gretag Macbeth). Evaluation criteria for the colorability are as described below. Table 22 shows the results of the evaluation.

A: $1.5<OD_1$
B: $1.4<OD_1\leq1.5$
C: $1.2<OD_1\leq1.4$
D: $1.0<OD_1\leq1.2$
E: $OD_1\leq1.0$ or the solid image was blurred (an ejection failure occurred).

(Character Quality)

Each of the black inks obtained in the foregoing was put into an ink cartridge, and the ink cartridge was mounted on an ink jet recording apparatus PIXUS iP4100 (manufactured by Canon Inc.). Then, characters were recorded on a Canon Plain Paper White SW-101 (manufactured by Canon Inc.) while the recording mode of the apparatus was set to a plain paper/standard mode. Thus, a recorded article was produced. The resultant recorded article was evaluated for its character quality by measuring the raggedness value Rag in a character portion. The raggedness value was measured with an image evaluating apparatus Personal IAS (manufactured by QEA). Evaluation criteria for the character quality are as described below. Table 22 shows the results of the evaluation.

A: $Rag<10$
B: $10\leq Rag<15$
C: $15\leq Rag<20$
D: $20\leq Rag<30$
E: $30\leq Rag$ or the characters were blurred (an ejection failure occurred).

(Bleeding Resistance)

Each of the black inks obtained in the foregoing was put into an ink cartridge, and the ink cartridge and a BCI-7 yellow ink as a dye ink were mounted on an ink jet recording apparatus PIXUS iP4100 (manufactured by Canon Inc.). Then, the following recorded article was produced on a Canon Plain Paper White SW-101 (manufactured by Canon Inc.) while the recording mode of the apparatus was set to a plain paper/ standard mode: characters were recorded with the black ink on a solid image formed with the dye ink. The resultant recorded article was evaluated for its bleeding resistance by measuring the raggedness value Rag in a character portion. The raggedness value was measured with an image evaluating apparatus Personal IAS (manufactured by QEA). Evaluation criteria for the bleeding resistance are as described below. Table 22 shows the results of the evaluation.

A: Rag<10
B: 10≦Rag<15
C: 15≦Rag<20
D: 20≦Rag<30
E: 30≦Rag or the characters were blurred (an ejection failure occurred).

(Dispersion Stability of Pigment)

Each of the black inks obtained in the foregoing was evaluated for its dispersion stability by measuring the average particle size of the pigment in the ink. The average particle size (volume-average particle size) $D_{50}$ of each pigment was measured with a Nanotrac particle size distribution measuring apparatus UPA-EX150 (manufactured by NIKKISO CO., LTD.). Evaluation criteria for the dispersion stability are as described below. Table 22 shows the results of the evaluation.

A: $D_{50}$<90
B: 90≦$D_{50}$<100
C: 100≦$D_{50}$<120
D: 120≦$D_{50}$<150
E: 150≦$D_{50}$ (Storage Stability of Ink)

The average particle size of the pigment in each of the black inks measured in the above evaluation of the pigment for its dispersion stability was expressed as $D_{50-1}$. In addition, each of the black inks obtained in the foregoing was stored in a thermostat having a temperature of 60° C. for one week. After that, the average particle size $D_{50-2}$ of the pigment in each of the black inks was measured with the same apparatus as that described above. Each ink was evaluated for its storage stability by determining the ratio $P=D_{50-2}/D_{50-1}$ from the resultant values $D_{50-1}$ and $D_{50-2}$. Evaluation criteria for the storage stability of each ink are as described below. Table 22 shows the results of the evaluation.

A: 0.95≦P<1.1
B: 0.90≦P<0.95, or 1.1≦P<1.2
C: 0.85≦P<0.90, or 1.2≦P<1.5
D: 0.7≦P<0.85, or 1.5≦P<2.0
E: P<0.7, or 2.0≦P

In the above five kinds of evaluation items, evaluation criteria A to C were defined as acceptable levels, and evaluation criteria D and E were defined as unacceptable levels.

TABLE 22

| | Black ink No. | Polymer in ink | Colorability | Character quality | Bleeding resistance | Dispersion stability of pigment | Storage stability of ink |
|---|---|---|---|---|---|---|---|
| Example 1 | 1 | 1 | A | A | A | A | A |
| Example 2 | 2 | 2 | B | B | B | A | B |
| Example 3 | 3 | 3 | A | A | A | A | A |
| Example 4 | 4 | 4 | A | A | A | A | A |
| Example 5 | 5 | 5 | B | A | B | B | B |
| Example 6 | 6 | 6 | A | A | A | A | A |
| Example 7 | 7 | 7 | A | A | A | A | A |
| Example 8 | 8 | 8 | B | A | B | B | B |
| Example 9 | 9 | 9 | A | A | A | A | A |
| Example 10 | 10 | 10 | A | B | B | B | B |
| Example 11 | 11 | 11 | B | B | B | C | C |
| Example 12 | 12 | 12 | B | B | B | B | C |
| Example 13 | 13 | 13 | A | A | B | B | B |
| Example 14 | 14 | 14 | C | C | C | C | C |
| Example 15 | 15 | 15 | B | C | C | B | C |
| Example 16 | 16 | 16 | B | B | C | C | C |
| Example 17 | 17 | 17 | B | B | B | B | C |
| Example 18 | 18 | 18 | A | A | A | A | A |
| Example 19 | 19 | 19 | A | A | A | A | A |
| Example 20 | 20 | 20 | A | A | A | A | A |
| Example 21 | 21 | 21 | B | B | B | C | B |
| Example 22 | 22 | 22 | A | A | A | A | A |
| Example 23 | 23 | 23 | A | A | A | A | A |
| Example 24 | 24 | 24 | A | B | B | B | B |
| Example 25 | 25 | 25 | B | B | B | C | B |
| Example 26 | 26 | 26 | B | B | C | C | C |
| Example 27 | 27 | 27 | B | A | A | A | C |
| Example 28 | 28 | 28 | B | B | C | C | C |
| Example 29 | 29 | 29 | A | A | A | C | B |
| Example 30 | 30 | 30 | A | A | A | B | B |
| Example 31 | 31 | 31 | A | A | A | A | A |
| Example 32 | 32 | 32 | A | A | A | A | A |
| Example 33 | 33 | 33 | B | B | B | A | A |
| Example 34 | 34 | 34 | B | B | B | B | B |
| Example 35 | 35 | 35 | A | A | A | C | C |
| Example 36 | 36 | 36 | A | A | A | A | A |
| Example 37 | 37 | 37 | A | A | A | A | A |
| Example 38 | 38 | 38 | A | A | A | C | C |
| Example 39 | 39 | 39 | A | A | A | C | C |
| Example 40 | 40 | 40 | A | A | A | A | A |
| Comparative Example 1 | 29 | 41 | D | E | E | B | B |
| Comparative Example 2 | 30 | 42 | E | E | E | E | E |

TABLE 22-continued

| | Black ink No. | Polymer in ink | Colorability | Character quality | Bleeding resistance | Dispersion stability of pigment | Storage stability of ink |
|---|---|---|---|---|---|---|---|
| Comparative Example 3 | 31 | 43 | E | E | E | E | E |
| Comparative Example 4 | 32 | 44 | —(*1) | —(*1) | —(*1) | —(*1) | —(*1) |
| Comparative Example 5 | 33 | 45 | E | E | E | D | E |
| Comparative Example 6 | 34 | 46 | E | E | E | E | E |
| Comparative Example 7 | 35 | 47 | D | E | E | C | E |
| Comparative Example 8 | 36 | 48 | D | E | E | B | C |

(*1)Dispersion did not occur.

<Preparation of Reaction Liquid>

The following respective components were mixed, and the mixture was filtrated. Thus, a reaction liquid was prepared.

| | |
|---|---|
| Diethylene glycol | 10.0 parts |
| Methyl alcohol | 5.0 parts |
| Magnesium nitrate | 3.0 parts |
| AE 100 | 0.1 part |
| Ion-exchanged water | 81.9 parts |

<Evaluations of Ink Set and Set of Inks and Reaction Liquid>

The black ink 1, the cyan ink, the magenta ink, and the yellow ink obtained in the foregoing were combined. Thus, an ink set was obtained. Each ink of which the ink set was formed was applied to a Canon Plain Paper White SW-101 (manufactured by Canon Inc.) so that the inks contacted each other. Thus, a recorded article was produced.

Evaluation for each of colorability and character quality was performed by the same method as that described above on the basis of the same criteria as those described above, and evaluation for bleeding resistance was performed in the same manner as that described above except that each of the color inks, i.e., cyan, magenta, and yellow inks, was used instead of the dye ink. In addition, each of the color inks was evaluated for each of the dispersion stability of its pigment and its storage stability by the same method as that described above on the basis of the same criteria as those described above. Table 23 shows the results of the evaluation.

Further, in the same recorded article (solid images each having a recording duty of 100%) as that produced at the time of the above evaluation for colorability with the respective color inks, i.e., cyan, magenta, and yellow inks, the hue of each image was measured. To be specific, coordinates a* and b* of each color image in the L*a*b* colorimetric system as a color difference representation method stipulated by CIE were measured with a reflection densitometer RD-19I (manufactured by Gretag Macbeth Co.), and the chroma C* defined by the following equation was calculated. Evaluation for chroma was performed on the basis of the resultant C*. It should be noted that the larger the chroma C*, the higher the colorability of the image. Table 23 shows the results of the evaluation.

$$C^* = \{(a^*)^2 + (b^*)^2\}^{1/2}$$

The reaction liquid obtained in the foregoing, and the black ink 1, the cyan ink, the magenta ink, and the yellow ink were combined. Thus, a set of the inks and the reaction liquid was obtained. The reaction liquid of which the set was formed was applied to a Canon Plain Paper White SW-101 (manufactured by Canon Inc.) in advance. After that, the black ink 1, and each of the color inks, i.e., cyan, magenta, and yellow inks were applied so that the reaction liquid and the inks contacted each other. Thus, a recorded article was produced.

Evaluation for each of colorability and character quality was performed by the same method as that described above on the basis of the same criteria as those described above except that the reaction liquid was used, and evaluation for bleeding resistance was performed in the same manner as that described above except that each of the color inks, i.e., cyan, magenta, and yellow inks, was used instead of the dye ink, and the reaction liquid was used. In addition, each of the color inks was evaluated for each of the dispersion stability of its pigment and its storage stability by the same method as that described above on the basis of the same criteria as those described above. Table 23 shows the results of the evaluation.

Further, in the same recorded article (solid images each having a recording duty of 100%) as that produced at the time of the above evaluation for colorability with the reaction liquid the respective color inks, i.e., cyan, magenta, and yellow inks, the hue of each image was measured. To be specific, coordinates a* and b* of each color image in the L*a*b* colorimetric system as a color difference representation method stipulated by CIE were measured with a reflection densitometer RD-19I (manufactured by Gretag Macbeth), and the chroma C* defined by the following equation was calculated. Evaluation for chroma was performed on the basis of the resultant C. It should be noted that the larger the chroma C*, the higher the colorability of the image. Table 23 shows the results of the evaluation.

$$C^* = \{(a^*)^2 + (b^*)^2\}^{1/2}$$

TABLE 23

| | | Example 41 Ink set | Example 42 Set of inks and reaction liquid |
|---|---|---|---|
| Colorability | Black ink | A | A |
| | Cyan ink | 52 | 56 |
| | Magenta ink | 60 | 67 |
| | Yellow ink | 85 | 90 |
| Character quality | Black ink | A | A |
| | Cyan ink | A | A |
| | Magenta ink | A | A |
| | Yellow ink | A | A |
| Bleeding resistance | Black ink | A | A |
| | Cyan ink | A | A |
| | Magenta ink | A | A |
| | Yellow ink | A | A |

TABLE 23-continued

| | | Example 41 Ink set | Example 42 Set of inks and reaction liquid |
|---|---|---|---|
| Dispersion stability of pigment | Black ink | A | |
| | Cyan ink | A | |
| | Magenta ink | A | |
| | Yellow ink | A | |
| Storage stability of ink | Black ink | A | |
| | Cyan ink | A | |
| | Magenta ink | A | |
| | Yellow ink | A | |

As can be seen from Table 23, the use of multiple inks of the present invention as inks of which an ink set was formed provided an image formed with the ink set with good colorability, good character quality, and good bleeding resistance even when the ink set did not use the reaction liquid. In addition, it was found that the colorability was significantly improved when the respective inks of which the ink set was formed were further used in combination with the reaction liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-260615, filed Oct. 7, 2008, which is hereby incorporated by reference herein in its entirety.

What is claimed is:

1. An ink jet ink comprising:
   a pigment; and
   a star polymer in which at least three copolymer chains of α,β-ethylenically unsaturated monomers are bonded to a central skeleton,
   wherein the copolymer chains of the α,β-ethylenically unsaturated monomers are copolymers of at least one first monomer selected from the group consisting of aromatic (meth)acrylates and aromatic (meth)acrylamides and at least one second monomer selected from the group consisting of acid monomers and salts of the acid monomers, and
   wherein an existence ratio $[M_1(50)/M_2(50)]/[M_1(100)/M_2(100)]$ determined from an existence ratio $M_1(50)/M_2(50)$ between the first monomer and the second monomer in a region from a start of a peak of a molecular weight distribution of the polymer obtained by gel permeation chromatography (GPC) in terms of polystyrene to 50% of the peak and an existence ratio $M_1(100)/M_2(100)$ between the first and second monomers in a region from 50% to 100% of the peak is 0.8 or more and 1.2 or less.

2. An ink jet ink according to claim 1, wherein the copolymer chains each have a number-average molecular weight of 400 or more and 3,000 or less.

3. An ink jet ink according to claim 1, wherein the number of the copolymer chains is three or more and eight or less.

4. An ink jet ink according to claim 1, wherein the polymer has a number-average molecular weight (Mn) obtained by gel permeation chromatography (GPC) in terms of polystyrene of 1,000 or more and 35,000 or less.

5. An ink jet ink according to claim 1, wherein a molecular weight distribution of the polymer obtained by gel permeation chromatography (GPC) in terms of polystyrene satisfies: 1.0≦(weight-average molecular weight in terms of polystyrene: Mw)/(number-average molecular weight in terms of polystyrene: Mn)≦1.5.

6. An ink jet ink according to claim 1, wherein a central compound obtained by isolating the central skeleton in the polymer is a sulfur-containing compound.

7. An ink jet ink according to claim 1, wherein a mass fraction of the first monomer in the polymer is 30.0 mass % or more and 85.0 mass % or less with reference to a total mass of the star polymer.

8. An ink jet ink according to claim 1, wherein the polymer has an acid value of 50 mgKOH/g or more and 150 mgKOH/g or less.

9. An ink jet ink according to claim 1, wherein the second monomer is at least one monomer selected from the group consisting of monomers each having a carboxyl group and salts of the monomers.

10. An ink jet ink according to claim 9, wherein the monomers each having a carboxyl group and the salts of the monomers are at least one compound selected from the group consisting of acrylic acid, methacrylic acid and salts thereof.

11. An ink jet ink according to claim 1, wherein the first monomer is benzyl (meth)acrylate.

12. An ink jet recording method comprising ejecting ink according to an ink jet system to perform recording on a recording medium, wherein the ink used in the ink jet recording method is the ink jet ink according to claim 1.

13. An ink cartridge comprising an ink storage portion for storing ink, wherein the ink stored in the ink storage portion is the ink jet ink according to claim 1.

* * * * *